United States Patent
Grisz et al.

(10) Patent No.: US 12,112,294 B2
(45) Date of Patent: Oct. 8, 2024

(54) MULTI-PHASE CONSOLIDATION OPTIMIZATION TOOL

(71) Applicant: United Parcel Service Of America, Inc., Atlanta, GA (US)

(72) Inventors: Benjamin Grisz, Armonk, NY (US); Casey Mccord, Armonk, NY (US); Emily Richards, Armonk, NY (US); Carol Crawford, Atlanta, GA (US); Jose Landeros, Atlanta, GA (US); Ayan Das, Atlanta, GA (US); Christopher Martin Rubio, Alpharetta, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 0 days.

(21) Appl. No.: 18/115,422

(22) Filed: Feb. 28, 2023

(65) Prior Publication Data
US 2023/0214761 A1 Jul. 6, 2023

Related U.S. Application Data

(63) Continuation of application No. 16/992,311, filed on Aug. 13, 2020, now Pat. No. 11,593,753.
(Continued)

(51) Int. Cl.
*G06Q 10/08* (2024.01)
*G06F 9/451* (2018.01)
(Continued)

(52) U.S. Cl.
CPC ......... *G06Q 10/0838* (2013.01); *G06F 9/451* (2018.02); *G06N 20/00* (2019.01);
(Continued)

(58) Field of Classification Search
CPC ............... G06Q 50/26; G06Q 30/0635; G06Q 10/0831; G06Q 10/087; G06Q 10/10; G06Q 10/0838; G06F 9/451; G06N 20/00
(Continued)

(56) References Cited

U.S. PATENT DOCUMENTS 9,020,631 B1 * 4/2015 Bellavance ............ G06Q 50/28
  700/223
2010/0247275 A1 * 9/2010 Karlen ................. B65D 88/022
  414/807
(Continued)

FOREIGN PATENT DOCUMENTS

WO WO-2008144681 A1 * 11/2008 ............. G06Q 10/08

*Primary Examiner* — Ariel J Yu
*Assistant Examiner* — Denisse Y Ortiz Roman
(74) *Attorney, Agent, or Firm* — Shook, Hardy & Bacon L.L.P.

(57) ABSTRACT

Rule data sets are received. These rule sets are associated with constraints controlling how records that are associated with the goods are consolidated. These goods are to be received for importing. An estimate score indicative of the risk for inspection for a first set of goods that are to be imported is generated. Based at least in part on the rule data sets and the generated estimate, a plurality of records are consolidated to a single instance for the first set of goods. Based on the consolidating, a user interface is caused to be generated that renders information associated with the consolidating.

18 Claims, 15 Drawing Sheets

Related U.S. Application Data

(60) Provisional application No. 62/886,154, filed on Aug. 13, 2019.

(51) Int. Cl.
| | | |
|---|---|---|
| *G06N 20/00* | (2019.01) | |
| *G06Q 10/083* | (2023.01) | |
| *G06Q 10/0831* | (2023.01) | |
| *G06Q 10/087* | (2023.01) | |
| *G06Q 10/10* | (2023.01) | |
| *G06Q 30/0601* | (2023.01) | |
| *G06Q 50/26* | (2024.01) | |

(52) U.S. Cl.
CPC ....... *G06Q 10/0831* (2013.01); *G06Q 10/087* (2013.01); *G06Q 10/10* (2013.01); *G06Q 30/0635* (2013.01); *G06Q 50/26* (2013.01)

(58) Field of Classification Search
USPC .......................................................... 705/28
See application file for complete search history.

(56) References Cited

U.S. PATENT DOCUMENTS

| | | | |
|---|---|---|---|
| 2011/0050397 A1* | 3/2011 | Cova | ................. G06Q 10/08 340/10.1 |
| 2021/0049548 A1 | 2/2021 | Grisz et al. | |

* cited by examiner

Incoming

Browse incoming vessels

| Vessel Name | SCAC | Estimated Arrival Date | Discharge Port | Destination Port | PO Count | Status | Actions |
|---|---|---|---|---|---|---|---|
| PARSIFAL | ZIMU | 2019/06/20 | LOS ANGELES | SHANGHAI | 3 | optimized on – 2019/07/01 | ⋮ — 603 |
| MAERSK EXETER | MEDU | 2018/09/04 | LOS ANGELES | SHANGHAI | 4 | not optimized | ⋮ |
| CSCL SPRING | CMDU | 2018/09/04 | LOS ANGELES | SHANGHAI | 2 | not optimized | ⋮ |
| COSCO AMERICA | CMDU | 2018/09/04 | LOS ANGELES | SHANGHAI | 5 | not optimized | ⋮ |

Optimization Detail

Historical Incoming    Lang▼

Recommended MPF: $1692.14
Recommended Savings: $1571.61

Custom MPF: $1670.72
Custom Savings: $1593.03

Customize — 703

Recommended

| Entry | POs |
|---|---|
| 40 | View ~705 |
| 41 | View |
| 42 | View |
| 43 | View |
| 50 | View |
| 60 | View |

Optimization History

| VESSEL | SCAC | DATE | Co.X MPF | Co.X EXPECTED COST | Co.X REALIZED MPF SAVINGS | OPTIMIZED MPF | OPTIMIZED EXPECTED COST | OPTIMIZED COST SAVINGS | OPTIMIZED METHOD | PERCENT COST SAVINGS |
|---|---|---|---|---|---|---|---|---|---|---|
| MSC VEGA | MAEU | 2019-05-01 | $671.92 | $675.28 | $0.00 | $517.10 | $529.06 | $146.22 | fixed | 21.65% |
| DIMITRA C | ONEY | 2019-04-22 | $1320.19 | $1320.19 | $0.00 | $508.70 | $508.70 | $811.49 | fixed | 61.47% |
| DIMITRA C | ONEY | 2019-04-22 | $1320.19 | $1320.79 | $0.00 | $508.70 | $512.90 | $807.89 | fixed | 61.17% |
| OOCL EUROPE | CMDU | 2019-05-08 | $2842.84 | $2842.84 | $0.00 | $1321.49 | $1321.49 | $1521.35 | fixed | 53.52% |
| OOCL EUROPE | CMDU | 2019-05-08 | $2842.84 | $4783.79 | $0.00 | $1321.49 | $3321.65 | $1462.14 | fixed | 30.56% |
| MAERSK SURABAYA | MEDU | 2019-05-17 | $15583.89 | $15583.89 | $8699.94 | $523.40 | $523.40 | $15060.49 | fixed | 96.64% |
| MAERSK SURABAYA | MEDU | 2019-05-17 | $15583.89 | $20519.03 | $8699.94 | $9016.19 | $14595.45 | $5923.58 | fixed | 28.87% |
| MSC VITTORIA | MAEU | 2019-05-17 | $1378.11 | $1378.11 | $0.00 | $869.41 | $869.41 | $508.70 | fixed | 36.91% |
| MSC VITTORIA | MAEU | 2019-05-17 | $1378.11 | $1378.71 | $0.00 | $869.41 | $870.44 | $508.26 | fixed | 36.87% |
| GUNHILDE MAERSK | MAEU | 2019-05-04 | $565.96 | $565.96 | $0.00 | $508.70 | $508.70 | $57.26 | fixed | 10.12% |

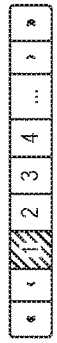

FIG. 10.

○ Historical  Incoming                                                                  Lang▾  ⊕▾

```
                    ┌─ MSC HEIDI – MEDU
              1105 ─┤   FIXED
                    └─ ETA: 2019-06-14
```

| | Total Entries | Optimized Cost Savings | MPF & Inspections Cost |
|---|---|---|---|
| 1107 | 145 | $28,054.51 | $13,015.68 |

| Actions | ENTRY ID | PO COUNT | INSPECTION PROBABILITY | PO TOTAL | TOTAL MPF AMOUNT | MPF SAVINGS |
|---|---|---|---|---|---|---|
| ≡ | 34 | 4 | 16.783% | $291,464.56 | $508.70 | $479.55 |
| ≡ | 38 | 11 | 0.190% | $604,721.23 | $508.70 | $1,512.99 |
| ≡ | 39 | 1 | 0.010% | $2,609.40 | $26.22 | $0.00 |
| ≡ | 40 | 1 | 0.010% | $10,003.84 | $34.65 | $0.00 |
| ≡ | 41 | 2 | 0.040% | $28,104.06 | $97.35 | $6.90 |
| ≡ | 43 | 1 | 0.010% | $5,442.94 | $26.22 | $0.00 |

○ Historical Incoming    Lang* ⊕*

1300

1303 — MSC HEIDI – MEDU

Invoice Details                                                    ✕

| TOTAL VALUE | TARIFF NUMBER | DESCRIPTION | INSPECT PROB LINE |
|---|---|---|---|
| $5,262.84 | 99038803 | MS CANVAS CARRY LILAC | 0.010% |
| $5,262.84 | 99038803 | MS CANVAS CARRY | 0.010% |
| $5,262.84 | 99038803 | MS CANVAS CARRY MULTI | 0.010% |
| $5,262.84 | 99038803 | MS CANVAS CARRY | 0.010% |
| $9,192.43 | 99038803 | MS CANVAS CARRY | 0.010% |
| $9,192.43 | 99038803 | MS CANVAS CARRY | 0.010% |

[Cancel] [OK]

Total Entries ... 14 ...pections Cost 015.68

| Actions | ENTRY ID | PO COUNT | | | | | | | MPF AMOUNT | MPF SAVINGS |
|---|---|---|---|---|---|---|---|---|---|---|
| ≡ | 34 | 4 | | | | | | | $508.70 | $479.55 |

| NUM ITEMS | PURCHASE ORDER NUMBER | BILL OF LADING | PO VALUE | PGA ITEM FLAG | INSPECT PROB | EVENT | Show Invoices |
|---|---|---|---|---|---|---|---|
| 6 | 5217962181 | QD728240 | $39,436.21 | 0 | 0.060% | | View |
| 2 | 1962561572 | S8067853 | $3,925.56 | 0 | 0.020% | | View |
| 1 | 8807961446 | MEDUS8065402 | $156,669.74 | 1 | 0.010% | 1STSETWK14 | View |
| 6 | 9518852384 | S8061096 | $91,433.05 | 0 | 16.708% | | View |

*FIG. 13.*

MULTI-PHASE CONSOLIDATION OPTIMIZATION TOOL

CROSS-REFERENCE TO RELATED APPLICATIONS

This application is a continuation to U.S. Non provisional patent application Ser. No. 16/992,311, filed Aug. 13, 2020, which claims priority to U.S. Provisional Patent Application No. 62/886,154 entitled "MULTI-PHASE CONSOLIDATION OPTIMIZATION TOOL," filed Aug. 13, 2019, the contents of which is incorporated by reference in its entirety.

TECHNICAL FIELD

The present disclosure generally relates to operator interfaces and specific optimization computer applications. In particular, this disclosure relates to user interfaces or optimization logic, such as machine learning software tools associated with consolidation.

BACKGROUND

Typical software applications and other technologies store data and statically generate functions to help users make cost-based decisions. For example, if a user wanted to calculate the cost of importing freight, the user may use electronic spreadsheets or other tools to manually input data, after which these applications perform simple linear calculations to give users a sense of overall costs. In an illustrative example, to calculate a Merchandise Processing Fee (MPF), an electronic spreadsheet application may receive user input of the overall value of a shipment or freight in a logical field. The electronic spreadsheet application may then perform a simple multiplication function by 0.3464 to determine the MPF fee. This gives users a sense of the MPF fee that will be due for importing the freight. However, these applications and other technologies do not dynamically learn or predict behavior based on unique signals or rules (e.g., risk of inspection, learned patterns from customs agencies or other entities, etc.), among other things.

BRIEF DESCRIPTION OF THE DRAWINGS

Figure 1:
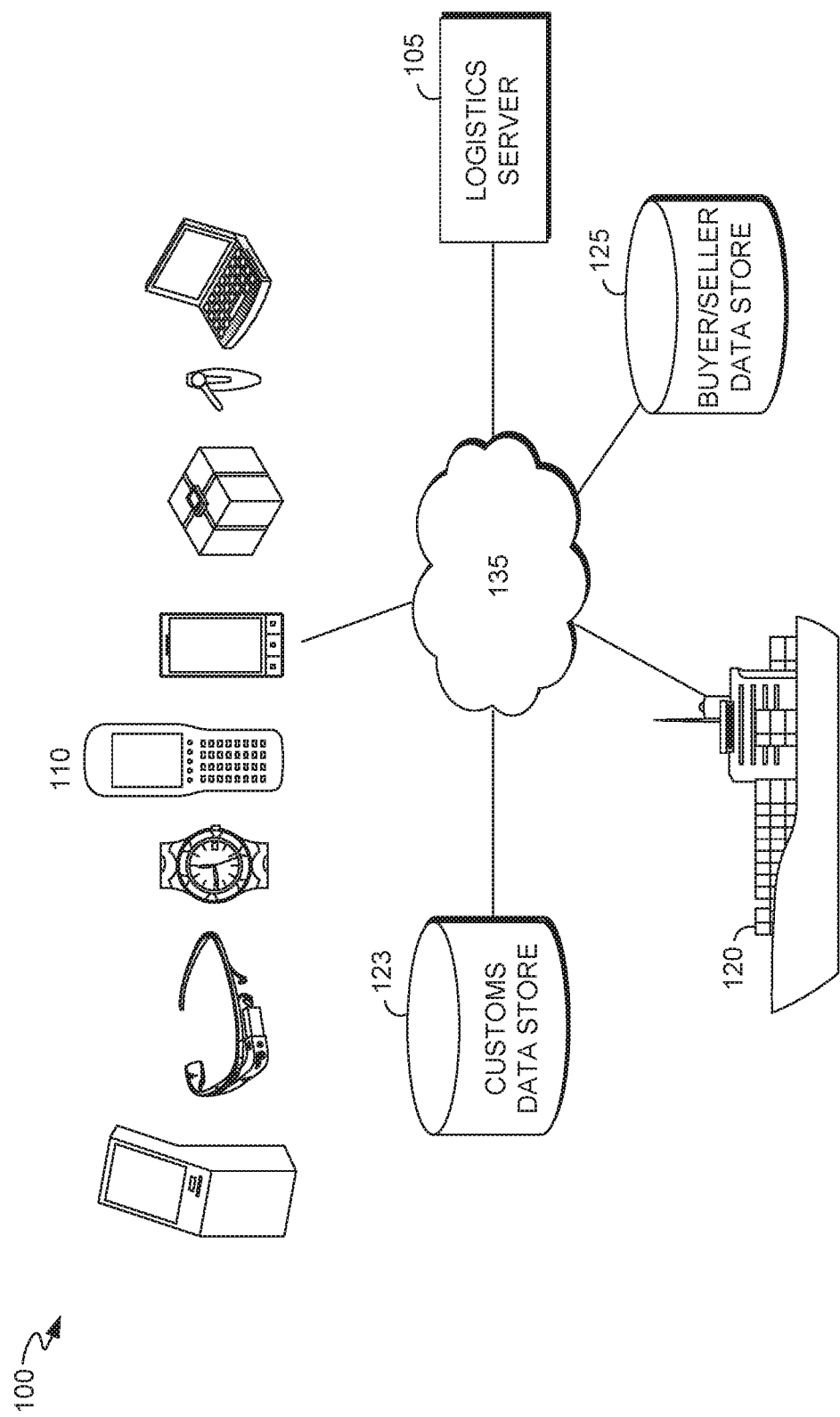

Having thus described the disclosure in general terms, reference will now be made to the accompanying drawings, which are not necessarily drawn to scale, and wherein:

FIG. 1 is a schematic diagram of an example computing environment in which aspects of the present disclosure are employed in, according to some embodiments.

Figure 2:
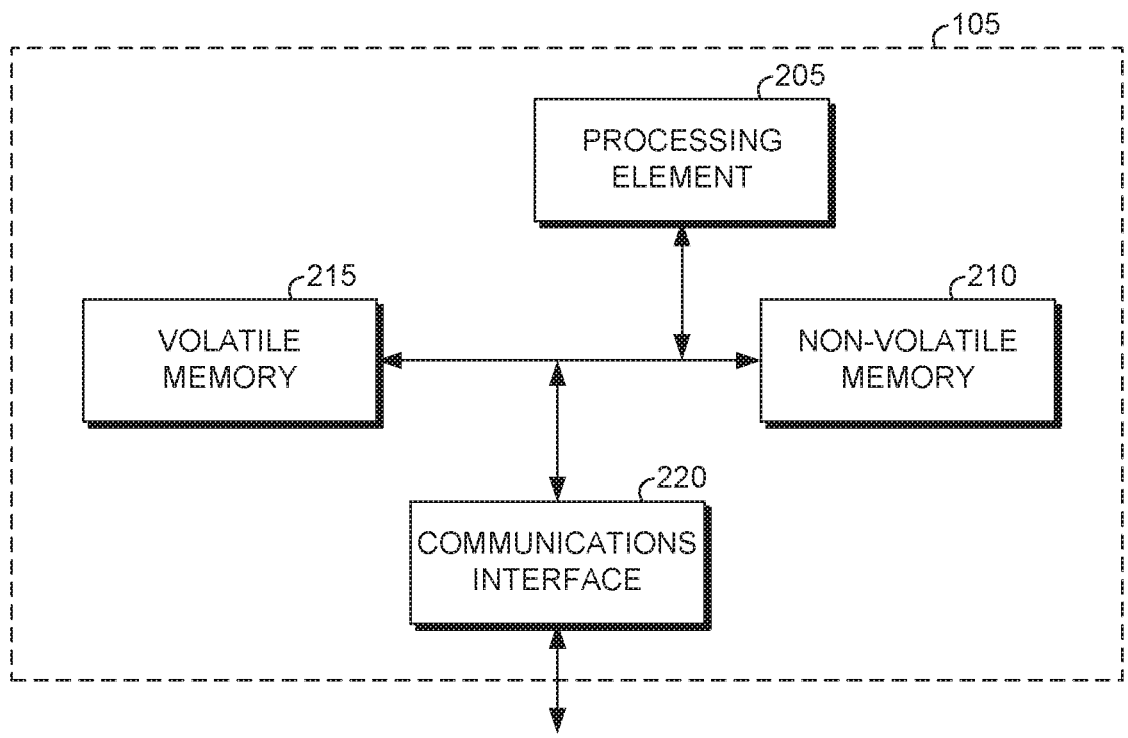

FIG. 2 is a schematic diagram of one or more logistics server(s) in which aspects of the present disclosure are employed in, according to some embodiments.

Figure 3:
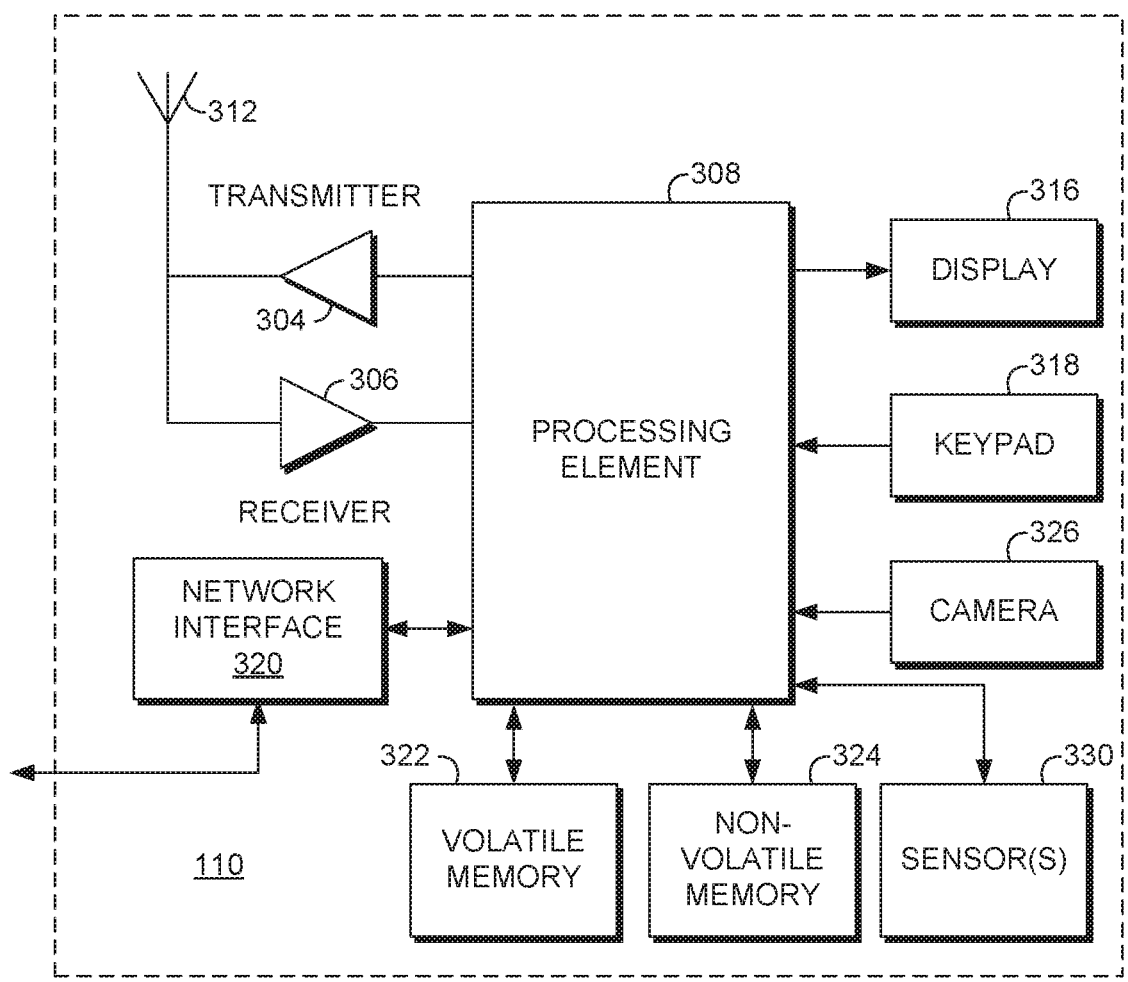

FIG. 3 is a schematic diagram of a computing entity in which aspects of the present disclosure are employed in, according to some embodiments.

Figure 4:
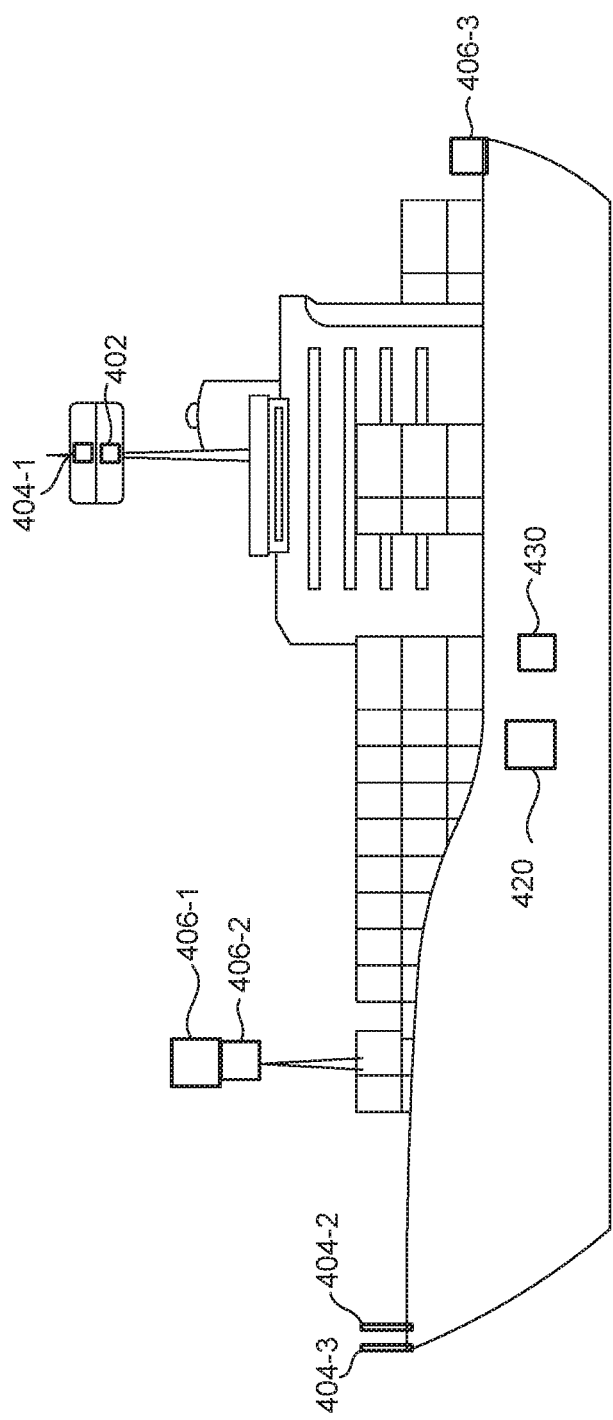

FIG. 4 is a block diagram of the logistics vehicle of FIG. 1, according to some embodiments.

Figure 5:
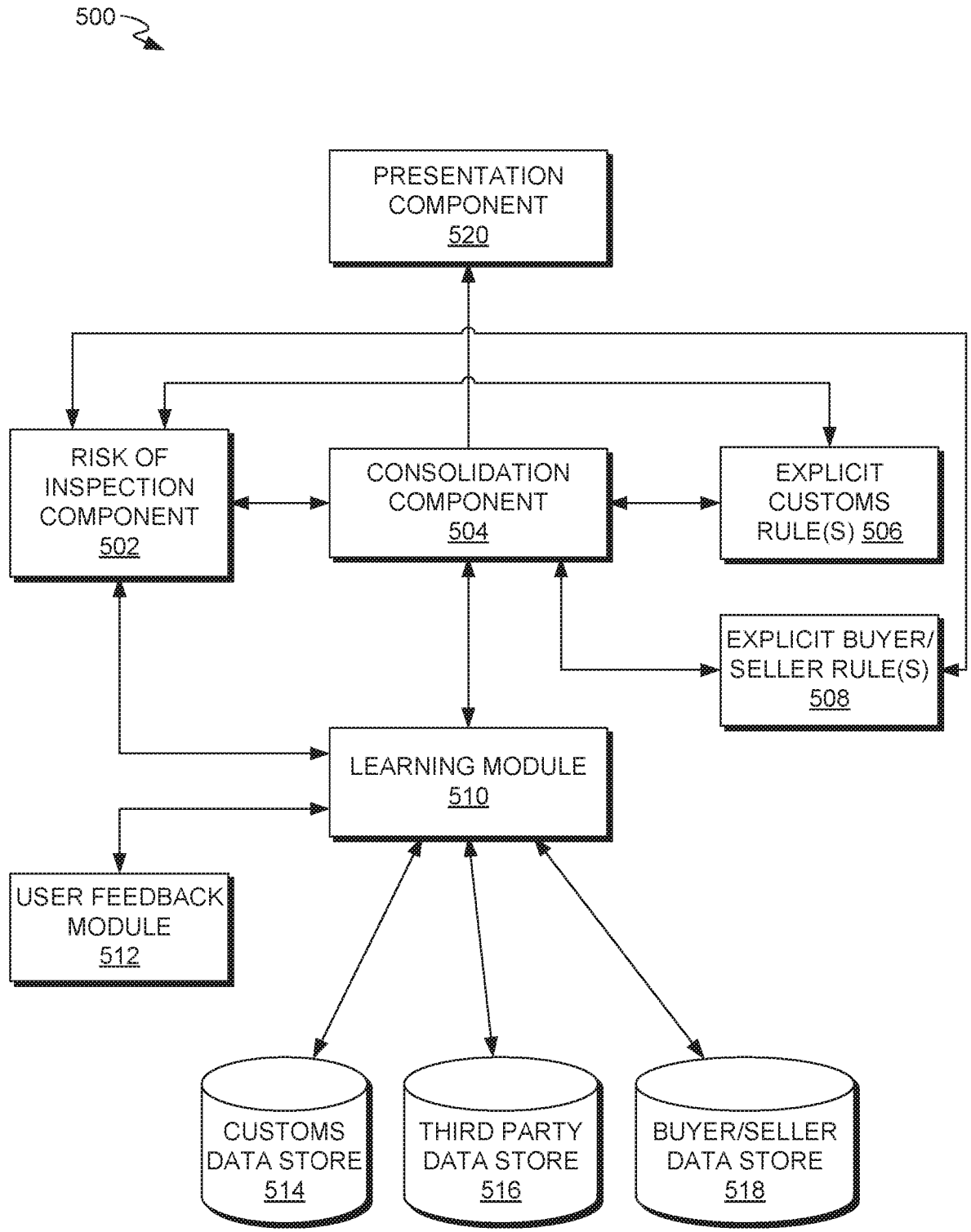

FIG. 5 is a block diagram of an example system architecture, in which some embodiments of the present disclosure are employed in.

FIG. 6 is a screenshot of a user interface indicating particular vessels that have been optimized for consolidation, according to some embodiments.

FIG. 7 is a screenshot of an example user interface illustrating optimization details, according to some embodiments.

Figure 8:
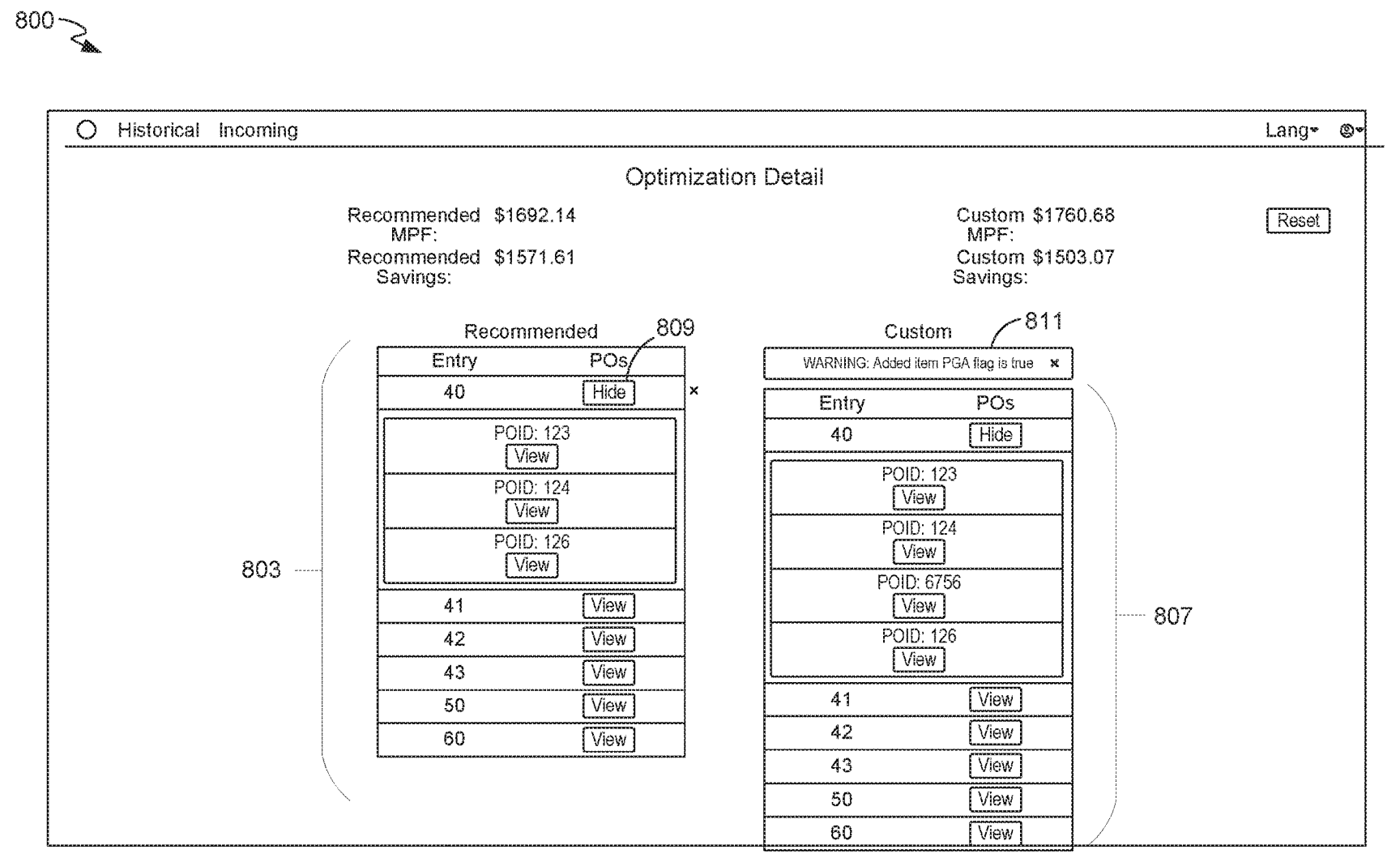

FIG. 8 is a screenshot of an example user interface illustrating purchase orders that are consolidated to particular entries and how the user can change or override optimization results via the user interface, according to some embodiments.

Figure 9:
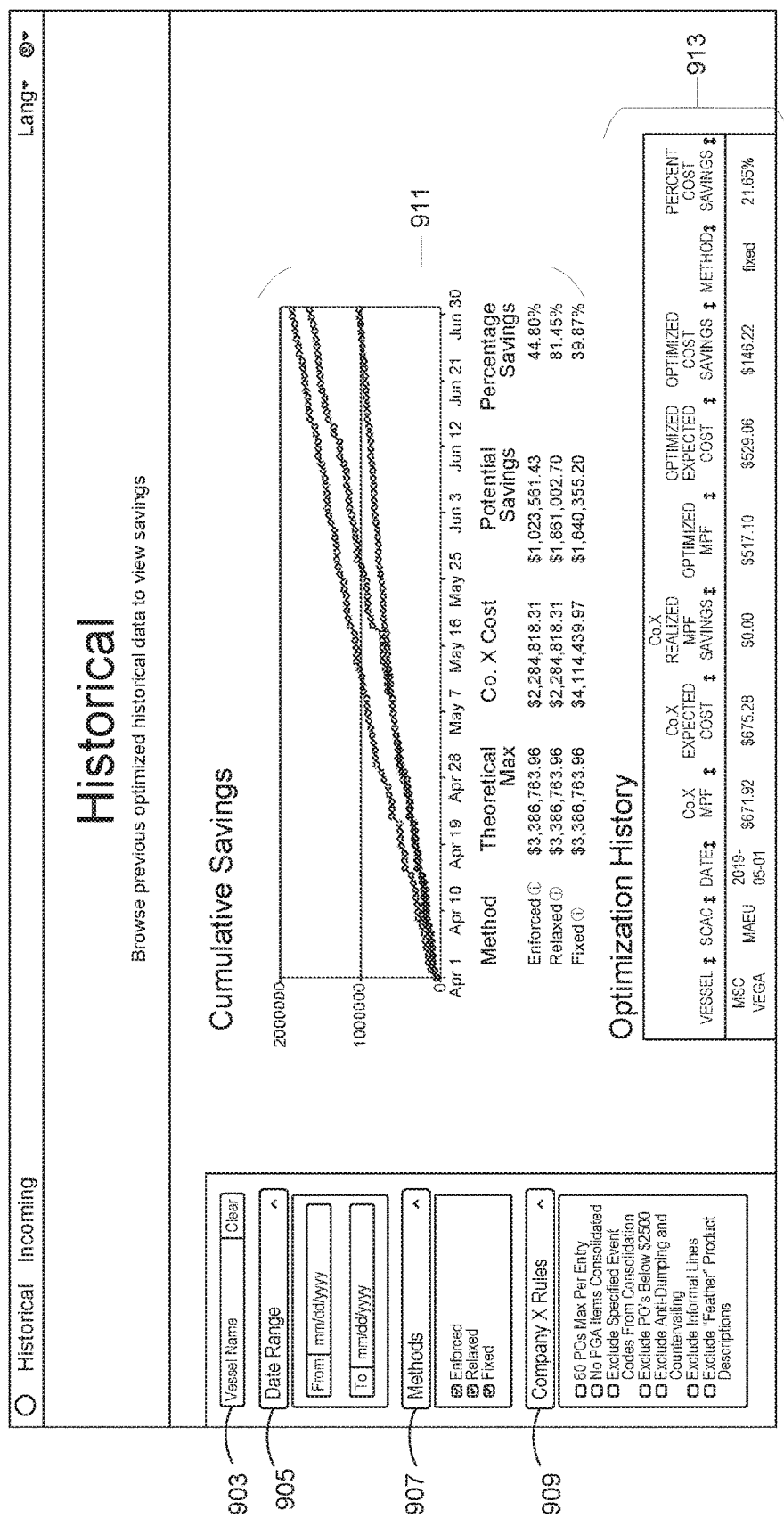

FIG. 9 is a screenshot of an example user interface that illustrates a historical view that tracks cumulative savings over a period of time, after optimization has occurred, according to some embodiments.

FIG. 10 is a screenshot of an example user interface that illustrates costs associated with consolidating and not consolidating purchase orders, according to some embodiments.

FIG. 11 is a screenshot of an example use interface that maps costs and savings with various entries, according to some embodiments.

Figure 12:

FIG. 12 is a screenshot of an example user interface that illustrates specific purchase order information for a given entry, according to some embodiments.

FIG. 13 is a screenshot of an example user interface illustrating invoice information of a particular purchase order, according to some embodiments.

Figure 14:
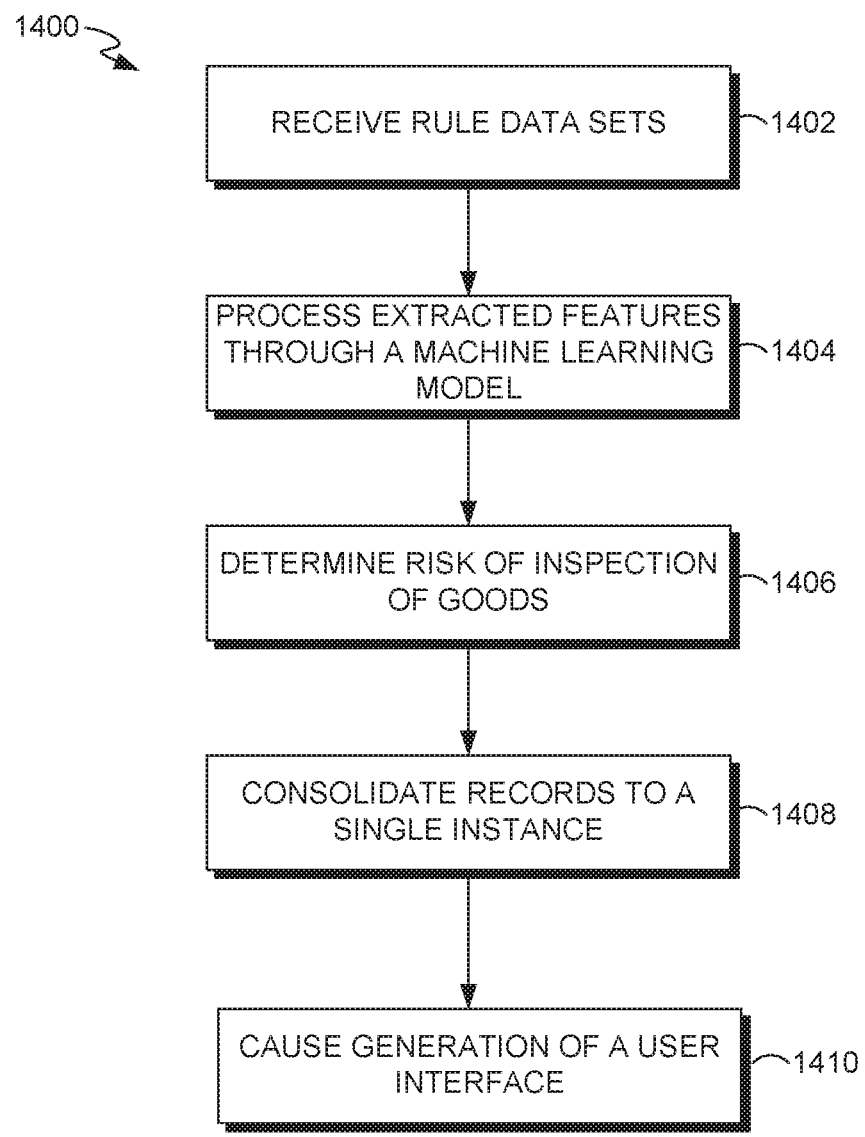

FIG. 14 is a flow diagram of an example process for consolidating records and generating a user interface, according to some embodiments.

Figure 15:
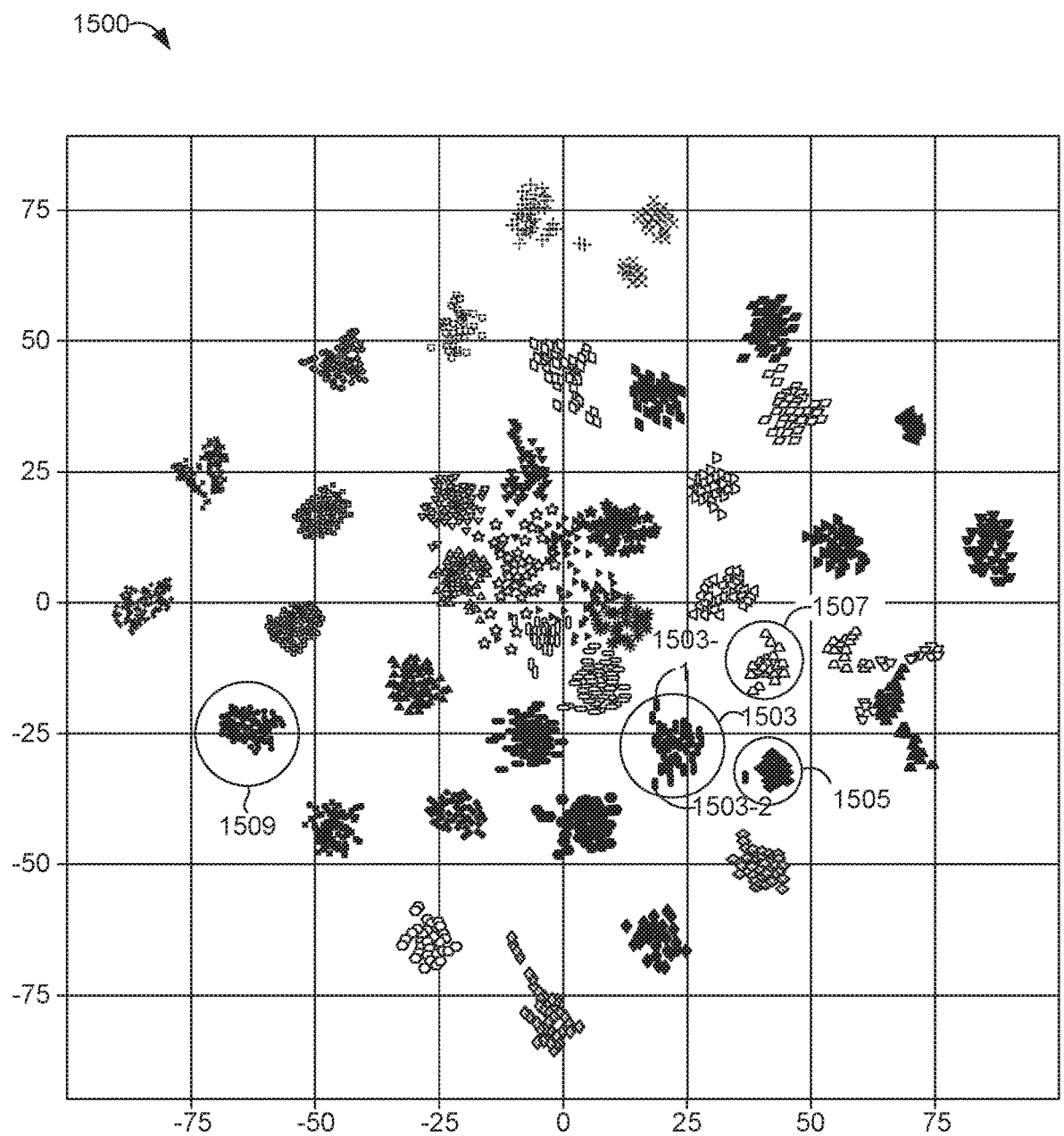

FIG. 15 is a schematic diagram of an example visualization of feature space that illustrates various feature vectors representing individual goods (or purchase orders that include a group of goods) and corresponding risk-of-inspection groups, according to some embodiments.

DETAILED DESCRIPTION OF THE INVENTION

The present disclosure will now be described more fully hereinafter with reference to the accompanying drawings, in which some, but not all embodiments of the disclosure are shown. Indeed, the disclosure may be embodied in many different forms and should not be construed as limited to the embodiments set forth herein. Rather, these embodiments are provided so that this disclosure will satisfy applicable legal requirements. Like numbers refer to like elements throughout.

I. OVERVIEW

As described above, existing technologies are static in that they are designed to receive extensive manual input after which they perform simple calculations. For example, certain spreadsheet computing tools are designed to receive user input in various fields and perform several calculations, such as trigonometry functions (e.g., return cosign of a given angle) or the chi-squared statistical test for independence. If a user wanted to, for example, consolidate freight records (e.g., purchase orders) to particular import entries, the user would have to manually input various fields of information, such as value of goods, multiplication factor, port, etc., after which the tool would perform static calculations to generate cost. The user may then manually decide to consolidate records to entries based on the tool cost output. However, these tools provide no way to optimize consolidation based on several new rules or factors, some of which are learned. Other tools, particularly in the freight industry, have user interfaces that are non-intuitive and require extensive drilling down of several layers before information is found.

Various embodiments of the present disclosure improve these existing technologies because they include new improved functionality not employed by these existing technologies. For example, various embodiments are directed to an optimization tool that automatically consolidates records based on various factors, signals, or phases (e.g., risk of inspection, learned customs agency behavior, PO buyer rules, PO seller rules, etc.). Further, particular embodiments improve existing software technologies by automating tasks (e.g., record consolidation) via certain new rules (e.g., risk of inspection threshold, customs rules, buyer or seller rules, etc.) that existing technologies do not utilize. As described above, such tasks are not automated in various existing technologies and have only been historically performed by humans or manual input of users using simplistic linear functionality. In particular embodiments, incorporating these certain new rules improve existing technological processes by allowing the automation of these certain tasks. Some embodiments of the present disclosure improve existing technologies by providing intuitive user interfaces that do not require extensive drilling down and tedious action. Accordingly, users can efficiently navigate these user interfaces Various existing technologies also consume an unnecessary quantity of computing resources, such as memory. For example, particular technologies do not consolidate purchase orders to particular entries. Each entry, however, may be allocated a memory address. Some embodiments of the present disclosure consolidate records based on several factors or rules, such as the probability of inspection and various learned insights. Because several records are consolidated as a single entry, memory utilization is decreased because the other single records are not stored as separate entries. For instance, the consolidated single entry can be assigned a single logical pointer, handle, or other reference indicator (as opposed to multiple reference indicators referencing individual records in existing technologies) such that all of the records can be located in memory in a single I/O (e.g., a read). This can improve CPU execution, for example, by reducing the amount of lookup time in memory to locate entries. Specifically, for example, CPU fetch, decode, and or execute functions can be improved, such as by decreasing fetch time by reducing the amount of time it has to take an address number associated with an instruction (e.g., an entry) from a program counter stored in memory since records are consolidated. Additionally, record or entry consolidation can reduce storage device (e.g., disk) I/O (e.g., excess physical read/write head movements on non-volatile disk) because consolidated records can be accessed in memory in a single pass or single I/O operation, as opposed to multiple, so requests do not have to repetitively reach out to the storage device to perform read/write operations. This can be important since repetitive I/O operations can eventually wear on components, such as a read/write head increase the likelihood of I/O errors (e.g., the read/write head reads an incorrect sector).

Additionally, fewer queries may be needed to obtain or access each record. Existing technologies issue repetitive queries to obtain each record or entry but this is computationally expensive. For example, an optimizer engine of a database manager module calculates a query execution plan (e.g., calculates cardinality, selectivity, etc.) each time a query is issued, which requires a database manager to find the least expensive query execution plan to fully execute the query. Most database relations, such as tables, contain hundreds if not thousands of records. Repetitively calculating query execution plans to obtain each record or entry, decreases throughput and increases network latency. However, because certain embodiments consolidate entries, when an optimizer engine of a database manager module calculates a query execution plan (e.g., calculates cardinality, selectivity, etc.) for the consolidated entries, the database manager only has to find the least expensive query execution plan for one record (i.e., the consolidated entry), instead of multiple records, which increases throughput and decreases network latency.

II. APPARATUSES, METHODS, AND SYSTEMS

Embodiments of the present disclosure may be implemented in various ways, including as apparatuses that comprise articles of manufacture. An apparatus may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double information/data rate synchronous dynamic random access memory (DDR SDRAM), double information/data rate type two synchronous dynamic random access memory (DDR2 SDRAM), double information/data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices/entities, computing entities, and/or the like. As such, embodiments of the present disclosure may take the form of an apparatus, system, computing device, computing entity, and/or the like executing instructions stored on a computer-readable storage medium to perform certain steps or operations. However, embodiments of the present disclosure may also take the form of an entirely hardware embodiment performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices/entities, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

III. EXEMPLARY SYSTEM ARCHITECTURE

FIG. 1 is a schematic diagram of an example computing environment 100 in which aspects of the present disclosure are employed in, according to some embodiments. As shown in FIG. 1, this particular computing environment 100 includes one or more freight vessels 120, one or more logistics servers 105, one or more computing entities 110 (e.g., a mobile device, such as a DIAD), one or more satellites 112, one or more networks 135, a customs data store 123, and a buyer/seller data store 125. Each of these components, entities, devices, systems, and similar words used herein interchangeably may be in direct or indirect communication with, for example, one another over the same or different wired and/or wireless networks. Additionally, while FIG. 1 illustrates the various system entities as separate, standalone entities, the various embodiments are not limited to this particular architecture.

In various embodiments, the network(s) 135 represents or includes an IoT network, which is a network of interconnected items that are each provided with unique identifiers (e.g., UIDs) and computing logic so as to communicate or transfer data with each other or other components. Such communication can happen without requiring human-to-human or human-to-computer interaction. For example, an IoT network may include the freight vessel 120, which is equipped with one or more sensors and transmitter in order to process and/or transmit sensor data over the network 135 to the logistics server(s) 105. In the context of an IoT network, a computer (not shown) within the freight vessel can be or include one or more local processing devices (e.g., edge nodes) that are one or more computing devices configured to store and process, over the network(s) 135, either a subset or all of the received or respective sets of data to the one or more remote computing devices (e.g., the computing entities 110 and/or the logistics server(s) 105) for analysis.

In some embodiments, the local processing device(s) is a mesh or other network of microdata centers or edge nodes that process and store local data received from sensors coupled to the freight vessel 120 and push or transmit some or all of the data to a cloud device or a corporate data center that is or is included in the one or more logistics server(s) 105. In some embodiments, the local processing device(s) store all of the data and only transmit selected (e.g., data that meets a threshold) or important data to the one or more logistics servers 105. Accordingly, the non-important data or the data that is in a group that does not meet a threshold is not transmitted. For example, a lidar, radar, and/or camera sensor located within the freight vessel 120 may sample map data but only push a portion of the map data. Accordingly, only after the condition or threshold has been met, do the local processing device(s) transmit the data that meets or exceeds the threshold to remote computing devices such that the remote device(s) can take responsive actions, such as notify a user mobile device (e.g., computing entity 110) indicating the threshold has been met and/or cause a modification of data (e.g., consolidate entries of purchase orders). The data that does not meet or exceed the threshold is not transmitted in particular embodiments. In various embodiments where the threshold or condition is not met, daily or other time period reports are periodically generated and transmitted from the local processing device(s) to the remote device(s) indicating all the data readings gathered and processed at the local processing device(s). In some embodiments, the one or more local processing devices act as a buffer or gateway between the network(s) and a broader network, such as the one or more networks 135. Accordingly, in these embodiments, the one or more local processing devices can be associated with one or more gateway devices that translate proprietary communication protocols into other protocols, such as internet protocols.

In some embodiments, the logistics server(s) 105 generates or causes user interfaces (e.g., FIGS. 6 through 13) to be displayed (e.g., to the computing entities 110) and/or consolidates entries based on one or more factors, such as rules indicated in the customs data store 123 and/or the buyer/seller data store 125 and/or sensor data detected from sensors within the freight vessel 120, as described in more detail below. Alternatively or additionally, in some embodiments, the logistics server(s) 105 cause a control signal to be transmitted based on one or more factors, such as rules indicated in the customer data store 123 and/or the buyer/seller data store 123 and/or sensor data detected from sensors within the freight vessel, as described in more detail below.

1. Exemplary Analysis Computing Entities

FIG. 2 provides a schematic of a logistics server(s) 105 according to particular embodiments of the present disclosure. In general, the terms computing entity, computer, entity, device, system, and/or similar words used herein interchangeably may refer to, for example, one or more computers, computing entities, desktops, mobile phones, tablets, phablets, notebooks, laptops, distributed systems, consoles input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In particular embodiments, these functions, operations, and/or processes can be performed on data, content, information/data, and/or similar terms used herein interchangeably.

As indicated, in particular embodiments, the logistics server(s) 105 may also include one or more communications interfaces 220 for communicating with various computing entities, such as by communicating data, content, information/data, and/or similar terms used herein interchangeably that can be transmitted, received, operated on, processed, displayed, stored, and/or the like.

As shown in FIG. 2, in particular embodiments, the logistics server(s) 105 may include or be in communication with one or more processing elements 205 (also referred to as processors, processing circuitry, and/or similar terms used herein interchangeably) that communicate with other elements within the logistics server(s) 105 via a bus, for example. As will be understood, the processing element 205 may be embodied in a number of different ways. For example, the processing element 205 may be embodied as one or more complex programmable logic devices (CPLDs), microprocessors, multi-core processors, co-processing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present disclosure when configured accordingly.

In particular embodiments, the logistics server(s) 105 may further include or be in communication with non-volatile media (also referred to as non-volatile storage, memory, memory storage, memory circuitry and/or similar terms used herein interchangeably). In particular embodiments, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases (e.g., parcel/item/shipment database), database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or information/data that is stored in a computer-readable storage medium using one or more database models, such as a hierarchical database model, network model, relational model, entity—relationship model, object model, document model, semantic model, graph model, and/or the like.

In particular embodiments, the logistics server(s) 105 may further include or be in communication with volatile media (also referred to as volatile storage, memory, memory storage, memory circuitry and/or similar terms used herein interchangeably). In particular embodiments, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the logistics server(s) 105 with the assistance of the processing element 205 and operating system.

As indicated, in particular embodiments, the logistics server(s) 105 may also include one or more communications interfaces 220 for communicating with various computing entities, such as by communicating information/data, content, information/data, and/or similar terms used herein interchangeably that can be transmitted, received, operated on, processed, displayed, stored, and/or the like. Such communication may be executed using a wired information/data transmission protocol, such as fiber distributed information/data interface (FDDI), digital subscriber line (DSL), Ethernet, asynchronous transfer mode (ATM), frame relay, information/data over cable service interface specification (DOCSIS), or any other wired transmission protocol. Similarly, the logistics server(s) 105 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, long range low power (LoRa), LTE Cat M1, NarrowBand IoT (NB IoT), and/or any other wireless protocol.

Although not shown, the logistics server(s) 105 may include or be in communication with one or more input elements, such as a keyboard input, a mouse input, a touch screen/display input, motion input, movement input, audio input, pointing device input, joystick input, keypad input, and/or the like. The logistics server(s) 105 may also include or be in communication with one or more output elements (not shown), such as audio output, video output, screen/display output, motion output, movement output, and/or the like.

As will be appreciated, one or more of the logistics server(s)'s 105 components may be located remotely from other logistics server(s) 105 components, such as in a distributed system. Additionally or alternatively, the logistics server(s) 105 may be represented among a plurality of analysis computing entities. For example, the logistics server(s) 105 can be or be included in a cloud computing environment, which includes a network-based, distributed/data processing system that provides one or more cloud computing services. Further, a cloud computing environment can include many computers, hundreds or thousands of them or more, disposed within one or more data centers and configured to share resources over the network(s) 135. Furthermore, one or more of the components may be combined and additional components performing functions described herein may be included in the logistics server(s) 105. Thus, the logistics server(s) 105 can be adapted to accommodate a variety of needs and circumstances. As will be recognized, these architectures and descriptions are provided for exemplary purposes only and are not limiting to the various embodiments.

2. Exemplary Computing Entities

Computing entities 110 may be configured for registering one or more users, providing freight import cost information, processing one or more shipping requests, securing parcels, monitoring shipments, and/or for operation by a user (e.g., a vehicle operator, delivery personnel, customer, and/or the like). In certain embodiments, computing entities 110 may be embodied as handheld computing entities, such as mobile phones, tablets, personal digital assistants, and/or the like, that may be operated at least in part based on user input received from a user via an input mechanism. Moreover, computing entities 110 may be embodied as onboard vehicle computing entities, such as central vehicle electronic control units (ECUs), onboard multimedia system, and/or the like that may be operated at least in part based on user input. Such onboard vehicle computing entities may be configured for autonomous and/or nearly autonomous operation however, as they may be embodied as onboard control systems for autonomous or semi-autonomous vehicles, such as unmanned aerial vehicles (UAVs), robots, and/or the like. As a specific example, computing entities 110 may be utilized as onboard controllers for UAVs configured for picking-up and/or delivering packages to various locations, and accordingly such computing entities 110 may be configured to monitor various inputs (e.g., from various sensors) and generated various outputs. It should be understood that various embodiments of the present disclosure may comprise a plurality of computing entities 110 embodied in one or more forms (e.g., parcel security devices kiosks, mobile devices, watches, laptops, carrier personnel devices (e.g., Delivery Information Acquisition Devices (DIAD)), etc.)

As will be recognized, a user may be an individual, a family, a company, an organization, an entity, a department within an organization, a representative of an organization and/or person, and/or the like—whether or not associated with a carrier. In particular embodiments, a user may operate a computing entity 110 that may include one or more components that are functionally similar to those of the logistics server(s) 105. FIG. 3 provides an illustrative schematic representative of a computing entity 110 that can be used in conjunction with embodiments of the present disclosure. In general, the terms device, system, computing entity, entity, and/or similar words used herein interchangeably may refer to, for example, one or more computers, computing entities, desktops, mobile phones, tablets, phablets, notebooks, laptops, distributed systems, vehicle multimedia systems, autonomous vehicle onboard control systems, watches, glasses, key fobs, radio frequency identification (RFID) tags, ear pieces, scanners, imaging devices/cameras (e.g., part of a multi-view image capture system), wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Computing entities 110 can be operated by various parties, including carrier personnel (sorters, loaders, delivery drivers, network administrators, and/or the like). As shown in FIG. 3, the computing entity 110 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, respectively. In some embodiments, the computing entity 110 includes one or more sensors 330. In this way, the computing entity 110 is a special-purpose computer or particular machine that is configured to specifically provide security for parcels. In some embodiments, at least one of the computing entities 110 is coupled to the freight vessel 120 (e.g., within the stem). The one or more sensors 330 can be one or more of: a pressure sensor, an accelerometer, a gyroscope, a geolocation sensor (e.g., GPS sensor), a radar, a lidar, sonar, ultrasound, an object recognition camera, and any other suitable sensor used to detect objects or obtain information in a geographical environment that the freight vessel is within. In some embodiments, the consolidation of entries or purchase orders is based on this sensor information.

The signals provided to and received from the transmitter 304 and the receiver 306, respectively, may include signaling information in accordance with air interface standards of applicable wireless systems. In this regard, the computing entity 110 may be capable of operating with one or more air interface standards, communication protocols, modulation types, and access types. More particularly, the computing entity 110 may operate in accordance with any of a number of wireless communication standards and protocols, such as those described above with regard to the logistics server(s) 105. In a particular embodiment, the computing entity 110 may operate in accordance with multiple wireless communication standards and protocols, such as UMTS, CDMA2000, 1×RTT, WCDMA, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the computing entity 110 may operate in accordance with multiple wired communication standards and protocols, such as those described above with regard to the logistics server(s) 105 via a network interface 320.

Via these communication standards and protocols, the computing entity 110 can communicate with various other entities using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The computing entity 110 can also download changes, add-ons, and updates, for instance, to its firmware, software (e.g., including executable instructions, applications, program modules), and operating system.

According to particular embodiments, the computing entity 110 may include location determining aspects, devices, modules, functionalities, and/or similar words used herein interchangeably. For example, the computing entity 110 may include outdoor positioning aspects, such as a location module adapted to acquire, for example, latitude, longitude, altitude, geocode, course, direction, heading, speed, universal time (UTC), date, and/or various other information/data. In particular embodiments, the location module can acquire information/data, sometimes known as ephemeris information/data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This information/data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information can be determined by triangulating the computing entity's 110 position in connection with a variety of other systems, including cellular towers, Wi-Fi access points, and/or the like. Similarly, the computing entity 110 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices/entities (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The computing entity 110 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the computing entity 110 to interact with and/or cause display of information from the logistics server(s) 105, as described herein. The user input interface can comprise any of a number of devices or interfaces allowing the computing entity 110 to receive information/data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the computing entity 110 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

As shown in FIG. 3, the computing entity 110 may also include an camera, imaging device, and/or similar words used herein interchangeably 326 (e.g., still-image camera, video camera, IoT enabled camera, IoT module with a low resolution camera, a wireless enabled MCU, and/or the like) configured to capture images. The computing entity 110 may be configured to capture images via the onboard camera 326, and to store those imaging devices/cameras locally, such as in the volatile memory 322 and/or non-volatile memory 324. As discussed herein, the computing entity 110 may be further configured to match the captured image data with relevant location and/or time information captured via the location determining aspects to provide contextual information/data, such as a time-stamp, date-stamp, location-stamp, and/or the like to the image data reflective of the time, date, and/or location at which the image data was captured via the camera 326. The contextual data may be stored as a portion of the image (such that a visual representation of the image data includes the contextual data) and/or may be stored as metadata (e.g., data that describes other data, such as describing a payload) associated with the image data that may be accessible to various computing entities 110.

The computing entity 110 may include other input mechanisms, such as scanners (e.g., barcode scanners), microphones, accelerometers, RFID readers, and/or the like configured to capture and store various information types for the computing entity 110. For example, a scanner may be used to capture parcel/item/shipment information/data from an item indicator disposed on a surface of a shipment or other item. In certain embodiments, the computing entity 110 may be configured to associate any captured input information/data, for example, via the onboard processing element 308. For example, scan data captured via a scanner may be associated with image data captured via the camera 326 such that the scan data is provided as contextual data associated with the image data.

The computing entity 110 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, information/data, applications, programs, program modules, scripts, source code, object code, byte code, compiled code, interpreted code, machine code, executable instructions, and/or the like to implement the functions of the computing entity 110. As indicated, this may include a user application that is resident on the entity or accessible through a browser or other user interface for communicating with the logistics server(s) 105 and/or various other computing entities.

In another embodiment, the computing entity 110 may include one or more components or functionality that are the same or similar to those of the logistics server(s) 105, as described in greater detail above. As will be recognized, these architectures and descriptions are provided for exemplary purposes only and are not limiting to the various embodiments.

3. Exemplary Freight Vessel 120

FIG. 4 is a block diagram of the freight vessel 120 of FIG. 1, according to some embodiments. Although the freight vessel 120 is represented as a specific vehicle with specific sensors, it is understood that any suitable vehicle and/or sensor may exist. For example, the freight vessel 120 may represent or alternatively be an airplane or other vehicle configured to transport freight or goods across geographical boundaries (e.g., countries, states, etc.).

In various embodiments, the freight vessel 120 includes the lidar units 404-1, 404-2, 404-3, the radar units 406-1 406-2, 406-3, the telematics device 420, the camera(s) 402, and the computing device 430 (e.g., a computing entity 110), such as an edge node. The lidar (Light Detection and Ranging) units 404 are sensors that detect objects and build a map of a geographical environment based on transmitting a plurality of light pulses a second and measure how long it takes for those light pulses to bounce off of objects in the environment back to the sensor (e.g., 150,000 pulses per second). These lidar units, such as 404-1, can indefinitely spin transversely in a plane parallel to the ground capturing a 360-degree image of the freight vessel 120's surroundings. The output is a three-dimensional mapping of the geographical environment. These sensors can also calculate the distance between itself and the objects within the environment, as well as detecting exact sizes, colors, shapes of objects, and/or other metadata.

The radar units 406 are similar to the lidar units 404 in that they also transmit signals and measure how long these signals take to bounce off objects back to the sensor. However, these signals are radio waves, instead of light pulses (which are faster). These sensors detect road or sea dynamics, such as detours, traffic delays, vehicle collisions, and other objects. Long range radar typically detects objects further away compared to lidar, which can be used for adaptive cruise control and the like. Whereas lidar typically detects objects that are less far away and is used for emergency braking, pedestrian detection, collision avoidance, etc.

The one or more cameras 402 utilize object recognition or computer vision algorithms to detect and classify objects on the road, such as lane lines and traffic signs. These cameras can provide images to the computing device 430 for determining depth of field, peripheral movement, and dimensionality of objects. In some embodiments, these cameras 402 use deep learning or other machine learning models and techniques for object classification. For example, in some embodiments, convolutional neural networks (CNN) are used to detect and classify objects, such as determining and classifying objects (e.g., car, person, traffic light, etc.). The one or more cameras 402 can be used for short-distance recognition, such park assistance, compared to other sensors, such as lidar.

The telematics device 420 is configured to control a variety of vehicle sensors, collect vehicle telematics data generated by sensors, and transmit the telematics data to the one or more analysis computing entities 105 and/or the computing entities 110 via one of several communication methods. In various embodiments, the freight vessel 120 is equipped with one or more vehicle sensors (e.g., the vehicle's engine speed sensor, speed sensor, seat belt status sensor, direction sensor, and location sensor). These sensors can detect one or more of the following attributes: engine ignition (e.g., on or off), engine speed (e.g., RPM and idle time events), vessel speed (e.g., miles per hour), seat belt status (e.g., engaged or disengaged), vessel heading (e.g., degrees from center), vessel backing (e.g., moving in reverse or not moving in reverse), vessel doors (e.g., open or closed), vessel handles (e.g., grasped or not grasped by a driver), vessel location (e.g., latitude and longitude), distance traveled (e.g., miles between two points), use of portable data acquisition device (e.g., in use or not in use), throttle position, pedal position, and other measurements (e.g., engine oil pressure, engine temperature, or engine faults). These sensors described above may be configured, for example, to operate in any fashion suitable to generate computer-readable data that may be captured and transmitted by the telematics device 420.

In some embodiments, the telematics device 420 includes one or more of the following components, which are not shown: a processor, a location-determining device or sensor (e.g., GPS sensor), a real-time clock, J-Bus protocol architecture, an electronic control module (ECM), a port for receiving data from the vehicle sensors in one of the logistics vehicles 120, a communication port for receiving instruction data, a radio frequency identification (RFID) tag, a power source, a data radio for communication with a WWAN, a WLAN and/or a WPAN, FLASH, DRAM, and NVRAM memory modules, and a programmable logic controller (PLC). In an alternative embodiment, the RFID tag, the location sensor, and the PLC may be located in the logistics vehicle 120 external to the telematics device 420. In various embodiments, the telematics device may omit certain of the components described above. It should be understood that the telematics device may include any other suitable components. For example, the telematics device may include other types of communications components than those described above.

According to one embodiment, a processor is configured to capture and store telematics data from one or more vessel sensors (e.g., GPS sensor, lidar unit 404, radar unit 406-1, etc.) on a freight vessel 120 upon the occurrence of one or more defined vehicle events. The processor is configured such that any parameter measurable by the one or more vehicle sensors may be defined as a vehicle event. The processor is also configured to associate telematics data received from the vehicle sensors 410 with contextual data indicating, for example: (1) the time the data was captured (e.g., through time-stamping), (2) the vessel the data was captured from, (3) the driver of the vessel, (4) a log reason for capturing the data, and/or (5) the route the driver was on at the time the data was collected. In various embodiments, the processor is further configured to transmit the telematics data to the computing entity 110 and/or the one or more analysis computing entities 105. In other embodiments, the processes described herein as being carried out by a single processor may be accomplished by multiple processors.

In one embodiment, the location sensor, which may be one of several components available in the telematics device 420, may be compatible with a low Earth orbit (LEO) satellite system or a Department of Defense (DOD) satellite system (e.g., via the satellite 112). Alternatively, triangulation may be used in connection with various cellular towers positioned at various locations throughout a geographic area in order to determine the location of the freight vessel 120 and/or its driver. The location sensor 202 may be used to receive position, time, and speed data. It will be appreciated by those skilled in the art that more than one location sensor 202 may be utilized, and that other similar techniques may likewise be used to collect geo-location information associated with the freight vessel 120 and/or its driver.

In some embodiments, the ECM with J-Bus protocol may be one of several components available in the telematics device 420. The ECM, which may be a scalable and subservient device to the telematics device 420, may have data processor capability to decode and store analog and digital inputs and ECM data streams from vehicle systems and the sensors. The ECM may further have data processing capability to collect and present vehicle data to the J-Bus (which may allow transmittal to the telematics device 420), and output standard vehicle diagnostic codes when received from a vehicle's J-Bus-compatible on-board controllers or vehicle sensors.

In some embodiments, an instruction data receiving port may be one of several components available in the telematics device 420. Embodiments of the instruction data receiving port may include an Infrared Data Association (IrDA) communication port, a data radio, and/or a serial port. The instruction receiving data port may receive instructions for the telematics device 420. These instructions may be specific to the freight vessel 120 in which the telematics device 420 is installed, specific to the geographical area in which the freight vessel 120 will be traveling, or specific to the function the freight vessel 120 serves within the fleet.

In some embodiments, a radio frequency identification (RFID) tag may be one of several components available for use with the telematics device 420. One embodiment of the RFID tag may include an active RFID tag, which comprises at least one of the following: (1) an internal clock; (2) a memory; (3) a microprocessor; and (4) at least one input interface for connecting with sensors located in the freight vessel 120 or the telematics device 420. Another embodiment of the RFID tag may be a passive RFID tag. One or more RFID tags may be internal to the telematics device 420, wired to the telematics device 420, and/or proximate to the telematics device 420. Each RFID tag may communicate wirelessly with RFID interrogators within a certain geographical range of each other. RFID interrogators may be located external to the freight vessel 120 and/or within the computing entity 110 that can be carried in and out of the freight vessel 120 by the vehicle operator.

In some embodiments, vehicle performance and tracking data collected by the telematics device 420 (e.g., telematics data) may be transmitted via a WPAN to, and stored by, the computing entity 110 until a communication link can be established between the computing entity 110 and the logistics server(s) 105, or similar network entity or mainframe computer system. In one embodiment, the computing entity 110 may display telematics data for the driver's or other entity viewing, which may be helpful in troubleshooting vehicle performance problems and showing delivery route progress, and/or consolidating entries. In an alternative embodiment, the computing entity 110 may be a hand-held data acquisition device, like an iPAQ. The Media Access Control (MAC) address, which is a code unique to each Bluetooth™-enabled device that identifies the device, similar to an Internet protocol address identifying a computer in communication with the Internet, can be communicated to other devices in communication with the WPAN, which may assist in identifying and allowing communication among vehicles, cargo, and portable data acquisition devices equipped with Bluetooth™ devices.

In some embodiments, the telematics device 420 receives the sensor data from the mapping sensors, such as the lidar units 404, radar sensors 406, and camera 402 in order to consolidate entries. For example, in some embodiments, the telematics data described above is combined with this mapping data from the sensors to provide additional insights, such as average speed of the freight vessel 120. In some instances, for example, it can be determined that customs agencies incorporate a specific rule or have a certain risk of inspection on a particular day. Accordingly, these sensors may calculate the average speed of the freight vessel 120, which can then be used to compute the day the freight vessel 120 will arrive at the importing station, which may be the day that the specific rule is followed or the risk of inspection is a particular risk value. Accordingly, this can be used to consolidate entries or purchase orders, as described in more detail below. Some embodiments additionally or alternatively send a control signal to the freight vessel 120, which causes the freight vessel to activate or perform specific functionality associated with record consolidation. For example, using the illustration above, if the risk of inspection is high for a particular day, then the one or more logistics server(s) 105 can send a control signal to the freight vessel 120, which causes the freight vessel 120 to speed up or slow down drive (e.g., via the lidar units 404, radar sensor 406, and the camera 406) so as to miss the day for which the risk of inspection is high.

In various instances, buyers or sellers have to pay a MPF when importing goods in the U.S. The MPF is a fee imposed by U.S. Customs and Border Protection (CBP) for processing imports and allowing the release of merchandise into the United States. For formal entries (e.g., merchandise value exceeding $2,500 USD), MPF is assessed on an ad valorem (according to value) basis, at 0.3464% of the entered value, with a minimum of $25.67 SD and a maximum of $497.99 USD. MPF is calculated by multiplying the shipment value by 0.3464%. For example, MPF on a shipment valued greater than $2,500 USD but less than $7,400 USD will be assessed at the minimum fee of $25.67.

As described herein, existing computing tools make these static calculations to determine what the importing costs will be. Typically, these importing transactions come in the form of purchase orders, which are logged in a database or data store as entries (e.g., either formal or informal). A purchase order (PO) (also referred to herein as a "record") is a document that indicates an offer issued by a buyer indicating various attributes, such as type of product/service needed, quantity of product/service needed, and agreed-upon prices for products/services. These POs can be stored or mapped to entries. "Entries" in some embodiments are a declaration of information on imported or exported goods. Each entry typically includes one or more purchase orders. An entry is typically the unit of information that customs clearance agents analyze before the corresponding goods enter (and/or exit) a particular country (e.g., a port of entry). In some embodiments, an entry refers to or includes a bill of entry. A "bill of entry" is a legal document filed by importers or customs clearance agents on or before the arrival of imported goods described in the bill of entry. Each bill of entry is submitted to the customs department as part of the customs clearance procedure (i.e., before goods are allowed to enter into a country). Bill of entries are typically examined by customs clearance agents for its accuracy and conformity with tariffs and/or regulations. As described herein, some goods within entries are also subject to inspection by these customs clearance agents. Entries can include customs classification number, country of importing origin, description of the goods/services at issue (e.g., as indicated in the P.O.), quantity (e.g., as indicated in the P.O.) of goods, estimated amount of duty to be paid, the particular POs within the entry, etc.

In some instances, importers may manually consolidate records so that they only have to pay a single maximum fee according to the MPF rules described above. For example, if a buyer knows that that two purchase orders have a high value and is likely to be at or exceed $497.99, the buyer may consolidate the POs so that the buyer only has to pay $497.99 instead of double for the two separate POs at $995.98. However, these MPF costs are not the only costs that importers are concerned with. Importers also have to pay for inspection fees. Customs inspections have an affinity for inspecting certain types of goods, while other goods are not always inspected. In many cases the overall cost can be unpredictable given certain affinity for particular goods associated with the inspection fees and existing computing tools do not sufficiently predict the risk of inspection.

Besides the fees, another challenge with inspection fees is that if particular goods within an entry or PO are subject to an inspection, then the entire set of goods or services pertaining to the entry is held or delayed for import or distribution because it is part of the entry for the goods that were subject to an inspection. This delay can be substantial (e.g., days or weeks), which can have a direct negative impact on the importer. The inspection fee challenge is compounded by the fact that it may be desirable to consolidate entries, as described above. However, the more records that are consolidated, the higher risk that at least one of the goods will be inspected and thus that the entire consolidated set of entries or associated goods will be delayed for transportation and distribution. Accordingly, the consolidation of records should be balanced with the risk of inspection while also taking into account entity (e.g., customs) rules and other criteria, such as buyer/seller requirements for consolidation of entries. A particular technical problem associated with these specific challenges are that existing computing tools do not adequately or intelligently predict the risk of inspection or how records should be consolidated based on this risk and other important factors, such as customs rules and specific buyer/seller rules. As described above, these tools either rely on too much manual user input or do not adequately make predictions and are computing resource intensive.

Various embodiments of the present disclosure are directed to predicting which records should be consolidated based on one or more factors, such as risk of inspection, customs rules, buyer/seller rules, learned data, and the Like, which is a particular solution to the technical problem described above.

Turning now to FIG. 5, FIG. 5 is a block diagram of an example system architecture 500, in which embodiments of the present disclosure are employed in, according to particular embodiments. In some embodiments, some or each of the components of FIG. 5 are included in the environment 100 of FIG. 1. For example, the components 504, 502, 506, 508, 510, and 512 may all be modules stored on the one or more logistics servers 105. In another example, the buyer/seller data store 124 may correspond or be the same as the buyer/seller data store 518. Likewise, the customs data store 123 may corresponds or be the same as the customs data store 514.

The consolidation component 504 receives multiple inputs from one or more of the other components and consolidates records to a single instance (e.g., record or entry) based on the multiple inputs. Alternatively or additionally, the consolidation component 504 refrains from consolidating records based on the multiple inputs in some embodiments. In this way entries are consolidated (or not consolidated) based on multiple phases or signals, as illustrated in FIG. 5. For example, the consolidation component 504 can receive the risk of inspection from the risk of inspection component 502. The risk of inspection component 502 calculates the risk of inspection estimate (e.g., a score) for a particular good or service and/or a particular PO or entry (or consolidated set of POs for a given entry). For example, the component 502 may generate that a particular set of consolidated set of POs have a 90% of being inspected, being that one of the goods in the consolidated entries, bananas, have a 90% chance of being inspected. As illustrated in FIG. 5, the risk of inspection can be based off of explicit customs rules 506, explicit buyer/seller rules, and or information learned by the learning module 510. In some embodiments, the risk of inspection component 502 uses one or more machine learning models via the learning module 510. For example, in some embodiments, a regression model is used to determine the probability of the risk of inspection given information from the learning module 510, the explicit customs rule(s) 506, and/or the explicit buyer/seller rule(s) 506. In other embodiments, a classification model or clustering model (e.g., as illustrated in FIG. 15) is used to determine risk of inspection classes or categories that are embedded in feature space based on their feature values and distance measures.

The explicit customs rules 506 are predefined rules that a customs agency (e.g., the CBP) enforces and thus are to be abided by. For example, a customs agency may require that a specific good is always inspected regardless of where it came from. Another rule may be that another good is only inspected if it came from a specific set of geographic locations associated with pestilence or disease. In some embodiments, the explicit customs rules 506 are included in the customs data store 514.

The explicit buyer/seller rules 508 are predefined rules that a seller and/or buyer of imported goods enforces or desires to be enforced and thus are to be abided by. For example, a buying retailer entity may provide a rule that indicates that certain products or entries of products are not to be consolidated (e.g., contained in the same entry for importing). In another example, an entity may provide that certain products are always consolidated (e.g., always contained in the same entry for importing). In some embodiments, the explicit byer/seller rules 508 are included in the buyer/seller data store 514.

The learning module 510 parses or extracts features of historical data, learns (e.g., via machine learning model training) about the historical data by making observations or identifying patterns in data, and then receive a subsequent input (a current data point) in order to make a determination, prediction, and/or classification of the subsequent input based on the learning. This learning information can then be passed to the consolidation component 504 so that the consolidation component can consolidate entries based on the data learned. In some embodiments, the learning module 510 is or includes one or more machine learning models, such as a neural networks, random forest models, logistic regression, linear regression, k-nearest neighbor, Bayesian networks, and the like. For example, although not a rule defined in the rules 506 and 508, the learning module 510 may identify a pattern in the customs data store 514 that imports coming from country X have a 80% chance of an inspection, regardless of the particular good. In some embodiments, the learning module 510 uses a "genetic algorithm," which generates group consolidation candidates, where each mutation or iteration has a fitness level associated therewith. The more fit individuals (or factors (e.g., inspection risk)) are, the more likely the particular factors will get passed to the next generation. The fitness is typically the value of the objective function in the optimization problem being solved. More fit individuals are typically selected from a population. The new generation of candidate consolidation groups are then used in the next iteration of the algorithm.

As described above, in some embodiments the learning module 510 (and/or the risk of inspection component 502) represents or uses one or more machine learning models that train on data to make predictions. Training is the process of machine learning model learning or tuning such that a prediction statistic (e.g., a classification prediction, a regression prediction, or clustering prediction) may become more increasingly accurate with higher confidence (and ideally with a lower error rate) after a particular threshold quantity of training sessions or epochs. For example, using the illustration above, the learning module 510 may identify a pattern, over various training stages, in the customs data store 514 that imports coming from country X have an 80% chance of an inspection. The confidence level for this prediction may get higher after each training stage and/or the actual chance of inspection may change. For example, after a first training stage, the learning module 510 may only predict that there is a 40% chance of inspection (as opposed to the last training stage, in which there is an 80% chance).

In some embodiments, training may include learning features (or feature values) of feature vectors (real numbers representing data) and responsively weighting them during training. A "weight" in various instances corresponds to the importance or significant of a feature or feature value for a decision statistic. For example, each feature may be associated with an integer or other real number where the higher the real number, the more significant the feature is for its classification. In some embodiments, a weight in a neural network or other machine learning application can represent the strength of a connection between nodes or neurons from one layer (an input) to the next layer (an output). A weight of 0 may mean that the input will not change the output, whereas a weight higher than 0 changes the output. The higher the value of the input or the closer the value is to 1, the more the output will change or increase. Likewise, there can be negative weights. Negative weights proportionately reduce the value of the output. For instance, the more the value of the input increases, the more the value of the output decreases. Negative weights may contribute to negative scores, which are described in more detail below. In many instances, only a selected set of features are primarily responsible for a determination of a risk of inspection. In an illustrative example, a first layer of nodes of a neural network may indicate the type of good that is to be inspected, where one node represents "fruit and vegetables" and another node represents "computer equipment" and another node represents "toys." After various training stages, it may be determined that fruits and vegetables are inspected at a much higher rate than computer equipment and toys. Accordingly, the "fruit and vegetables" node can be activated or weighted much higher relative to the other nodes, such that a prediction of an incoming data point (e.g., a fruit record) can be predicted based on this weighting. Thus, over various training stages or epochs, certain feature characteristics for each feature vector can be learned or weighted. In this way, embodiments learn weights corresponding to different features such that similar features found in different tables contribute positively to a prediction statistic (e.g., a node is activated) and features that can change contribute negatively to the prediction statistic (e.g., a node is inhibited).

This information predicted or identified by the learning module 510 may then be passed to the risk of inspection component 502 and then responsively provided to the consolidation component 504. In another example, the learning module 510 may predict, via analyzing the buyer/seller data store 518, that a buyer will consolidate all of item X in a purchase order based on past purchase order history of the same consolidation and/or based on the amount of sales of the good and the non-risk of inspection associated with the particular good. In yet another example, the learning module 510 may predict, via analyzing the customs data store 514, that a particular good will get inspected based on historical dates of inspection of the particular, type of good, time of year, who the inspector is, the country where the import originated from, and/or the country where the import will arrive at.

The user feedback module 512 receives user input or selections and passes those to the learning module so that the learning module 510 can further optimize learning. For example, at a first time the learning module 510 may predict that various entries should be consolidated based on an explicit customer rule. However, a user with knowledge of a brand new rule or other factor, can either input, via the user feedback module 512, the new rule or the entries that are consolidated/not consolidated based on the new rule.

In some embodiments, the third party data store 516 corresponds to any data that does not correspond do a custom entity or buyer/seller. For example, the third party data store can be any data that the learning module 510 uses to make predictions, such as unstructured social media data, blogs, e-books, news feeds. In some embodiments, alternatively or additionally, the third part data store 516 corresponds to each of the sensor data obtained from the freight vessel 120 of FIG. 1 and/or FIG. 4. In this way predictions or consolidations of entries can be based at least in part on outside or third party data, such as sensor data that the freight vessel 120 has captured.

The presentation component 520 provides an associated user interface, which is highly intuitive and user efficient, as described in more detail herein. For example, the presentation component 520 can cause display of the risk of inspection associated with the risk of inspection component 502, consolidation entry candidates, rules, and the like. The presentation component 520 is generally responsible for structuring, tagging, or otherwise formatting information derived from the consolidation component 504. For example, the presentation component 520 can cause display of a user interface of a user device that includes the prediction made by the learning module 510 and the confidence level, the information determined by the risk of inspection component 502, and/or the explicit customs rule(s) 506/explicit buyer/seller rule(s).

In some embodiments, the consolidation component 504 communicates, via an application programming interface (API), to the presentation component 520. In some embodiments, the presentation component 520 includes one or more applications or services on a user device (e.g., the mobile computing entity 110), across multiple user devices, or in the cloud. For example, in some embodiments, presentation component 520 manages the presentation of content to a user across multiple user devices associated with that user.

Based on content logic, device features, and/or other user data, presentation component 520 may determine on which user device(s) content is presented, as well as the context of the presentation, such as how (or in what format and how much content, which can be dependent on the user device or context) it is presented, when it is presented. In particular, in some embodiments, presentation component 520 applies content logic to device features, or sensed user data to determine aspects of content presentation.

In some embodiments, presentation component 520 generates user interface features. Such features can include interface elements (such as graphics buttons, sliders, menus, audio prompts, alerts, alarms, vibrations, pop-up windows, notification-bar or status-bar items, in-app notifications, or other similar features for interfacing with a user), queries, and prompts. For example, the presentation component 220 can present the user interfaces as illustrated in FIG. 6 through FIG. 13.

Alternative or in addition to the presentation component 520 functionality, in some embodiments the consolidation component 504 communicates, via an API, to a control signal propagator (not shown). This communication causes the control signal propagator to send a control signal to a machine, apparatus, or article of manufacture, which effectively and tangibly causes such machine, apparatus, or article of manufacture to activate or otherwise perform a particular function based at least in part on the functionality performed by the consolidation component 504. For example, the control signal propagator can send a control signal to a computing device (e.g., the mobile computing entity 110) causing an auditory (e.g., a beeping sound), visual (e.g., flashing LEDs), buzzing/vibrating, and/or other alert type based on the consolidation component 504 consolidating or not consolidating records (or recommending to do such action). For instance, the consolidation component 504 may determine that the risk of inspection is high (via the risk of inspection component 502) and responsively send a computer-readable set of instructions to a device, causing a device to generate an alert (e.g., an audio or visual alert) of the high risk of inspection, as well as a prompt to receive user approval to consolidate the entries. In some embodiments, in response to receiving such approval user input, the consolidation component 504 may consolidate entries. In another example, if the learning module 510 predicts, via analyzing patterns in the customs data store 514, that there will be a high risk of inspection if goods arrive at the inspection center at a particular day, the consolidation component 505 (or control signal propagator) can send a control signal to the freight vessel 120 to change its course (e.g., speed up or slow down via its driverless sensors) so that it does not arrive at the particular day.

IV. EXEMPLARY SYSTEM OPERATION

FIG. 6 is a screenshot 600 of a user interface indicating particular vessels that have been optimized for consolidation, according to some embodiments. In some embodiments, the screenshot 600 (or any screenshot described herein) is provided by a logistics entity, such as by the logistics server(s) 105 (e.g., over the network(s) 135 to the computing entity 110). In particular embodiments, the screenshot 600 (or any screenshot described herein) is provided to any suitable entity, such as one or more of the computing entities 110, the presentation component 520, and/or the freight vessel 120. The screenshot 600 (or any screenshot described herein) can be accessed or provided in any suitable manner. For example, in some embodiments, a user can open a client application, such as a web browser, and input a particular Uniform Resource Locator (URL) corresponding to a particular website or portal. In response to receiving the user's URL request, an entity, such as the one or more analysis computing entities 105 may provide or cause to be displayed to a user device (e.g., a computing entity 110), the screenshot 700. A "portal" as described herein in some embodiments includes a feature to prompt authentication and/or authorization information (e.g., a username and/or passphrase) such that only particular users (e.g., a corporate group entity) are allowed access to information. A portal can also include user member settings and/or permissions and interactive functionality with other user members of the portal, such as instant chat. In some embodiments a portal is not necessary to provide the user interface, but rather any of the views can be provided via a public website such that no login is required (e.g., authentication and/or authorization information) and anyone can view the information. In yet other embodiments, the screenshot 600 represents an aspect of a locally stored application, such that a computing device hosts the entire application and consequently the computing device does not have to communicate with other devices (e.g., the logistics server(s) 105) to retrieve data. In various embodiments, the presentation component 520 determines or provides each of the data described in the screenshot 600 (or any screenshot described herein)

The screenshot 600 includes various attributes or columns, such as the vessel name, SCAC, Estimated Arrival Date, Discharge Port, Destination Port, PO Count, Status, and Actions. Each record or row within the screenshot corresponds to a particular freight vessel (e.g., freight vessel 120). The "vessel name" attributes corresponds to the ID of the particular freight vessel. The "SCAC" identifier represents a "Standard Carrier Alpha Code," which is an identifier used to identify road transport companies. In some instances, vessel operating common carriers (VOOCs) have SCAC codes. The "Estimated Arrival Date" attribute corresponds to an estimated arrival of the particular vessel carrying cargo or imports. In some embodiments, the "Estimated Arrival Date" is predicted by the learning module 510, as described with respect to FIG. 5. In some embodiments, the "discharge port" attribute identifies the particular port where a particular vessel will unload its cargo, which is then dispatched to consignees. In some embodiments, the "destination port" attribute identifies the final arrival point of a shipment. The "PO count" attribute corresponds to the purchase order count or the quantity of POs that have been consolidated (e.g., as determined by the consolidation component 504). The "Status" attribute indicates whether entries or POs for the particular vessel record have been "optimized." In some embodiments, "optimized" refers to an indication of whether the system has intelligently generated consolidation groups based on multi-phase factors, such as generating different candidate entries of consolidation to determine the most optimal grouping of POs or entries. For example, optimization may indicate whether the consolidation component 504 has consolidated entries based on the inputs received from the rest of the components. The "Actions" attribute corresponds to additional information associated with the vessel record that may be accessed via drill down, for example, as described in more detail below.

FIG. 7 is a screenshot 700 of an example user interface illustrating optimization details, according to some embodiments. In these embodiments, optimization has already occurred (e.g., the consolidation component 504 has generated candidate entry groupings), and the user interface of FIG. 7 is responsively generated. In some embodiments, the screenshot 700 is rendered or provided in response to receiving a user selection of the UI element 603 under the "Action" attribute for one of the records illustrated in FIG. 6 where the record has been "optimized." For example, in response to receiving a selection of the UI element 603 for the record vessel name "PARSIFAL," the screenshot 700 may be caused to be displayed, indicating more detail associated with the "PARSIFAL" record. In some embodiments, the "Recommended MPF" and "Recommended savings" values correspond to what the MPF is projected to be after optimizations (e.g., functionality performed by the consolidation component 504), and the predicted savings. In some embodiments, the "Custom MPF" and "Custom Savings" values correspond to user changes to the optimization logic or "Recommended MPF" or "Recommended Savings" figures, as described in more detail herein.

The screenshot 700 also illustrates various entry records mapped to POs. Accordingly, a particular entry may include one or more purchase orders. For example, entry 40 is mapped to one or more purchase orders. In various embodiments, in response to receiving a user selection of the "View" button (e.g., the button 705) under the POs attribute, the system causes each of the purchase orders that were consolidated to the corresponding entry (e.g., entry 40) to be displayed. In this way, users can see what purchase orders have been consolidated based on the optimization logic. In some embodiments, in response to receiving a user selection of the "customize" button 703 in the screenshot 700, a user interface is provided to allow the user to manually re-arrange consolidation. For example, the consolidation component 504 may have consolidated 3 purchase orders to entry 40. However, the user may decide she does not want one of the purchase orders consolidated. Accordingly, particular embodiments receive a user selection or other user input to remove one of the three purchase orders from consolidation. Responsively, the user feedback module 512 may receive and store, in memory, the user input such that there is a new consolidation output caused to be displayed in response to receiving a selection of the button 705.

FIG. 8 is a screenshot 800 of an example user interface illustrating purchase orders that are consolidated to particular entries and how the user can change or override optimization results via the user interface, according to some embodiments. In some embodiments, these changes are uploaded by the user feedback module 512. In some embodiments, the screenshot 800 (and/or the data under the "custom" attribute (e.g., including record 805)) is caused to be provided in response to receiving a selection of the "customize" button 703 of the screenshot 700 of FIG. 7. The "POID" corresponds to the purchase order ID. FIG. 8 illustrates, among other things, that the optimization system (e.g., the consolidation component 504) recommended consolidating purchase order IDs 123, 124, and 125 to entry 40, as illustrated in the "Recommended" box 803. In some embodiments, the box 803 is caused to be displayed in response to receiving a selection of the view button 705 of FIG. 9. Likewise, in some embodiments, in response to receiving a user selection of the "hide" button 809, particular embodiments cause the box 803 to identically be displayed relative to FIG. 7.

As illustrated in the "Custom" box 807, POID 6756 has additionally been added to entry 40. As described above, "custom" functionality in various embodiments, allows a user to make changes to optimization, such as adding purchase orders to particular entries, as illustrated in the custom box 807 of FIG. 8. Alternatively or additionally, users can make other changes, such as removing purchase orders, changing rules used for optimization, etc. In this way, users can drag or drop POIDs to create new consolidation arrangements. In some embodiments, in response to receiving such drags or drops or other user changes, the system updates and provides for display the costs and/or savings associated therewith (e.g., the "Custom MPF" and "Custom Savings" values as illustrated in FIG. 7). In some embodiments, alerts are also generated or provided for display in response to a detection of rules or constraints (e.g., from the explicit customs rules 506 or the explicit buyer/seller rules 508) being broken (and/or followed). In some embodiments, these alerts are also generated and displayed anytime there is a high-risk item (e.g., item having a high risk of inspection) being consolidated manually by the user. For example, the notification 811 stating "WARNING: Added item PGA flag is true" may indicate that the newly added POID 6756 has a high probability of inspection or that at Partner Government Agency regulates a specific good to be imported, thereby leading to a determination of high probability of inspection.

In some embodiments, the system (e.g., the consolidation component 504) uses user changes or selections to further optimize or learn what the particular user does. For example, a machine learning algorithms may identify patterns or associations that the user makes over time with respect to the "Custom" box, so that the system can continually optimize functionality. In this way, for example, the learning module 510 can receive user selections via the user feedback module 512 to continually learn so that the consolidation component 504 can generate current or future consolidated groups of records (or refrain from consolidating records) based on the user feedback from prior sessions or history of user selections. In response to receiving a user selection of the UI element 813, particular embodiments reset record consolidation back to a default setting. For example, in response to receiving a user selection of the UI element 803, particular embodiments remove record POID: 6756 from the entry 40 such that it reflects the recommended box 803. Alternatively, the recommended box 803 can remove all of its POIDs (i.e., POIDs 123, 124, and 126) such that there is not consolidation.

FIG. 9 is a screenshot 900 of an example user interface that illustrates a historical view that tracks cumulative savings over a period of time, after optimization has occurred (e.g., after the consolidation component 504 has generated recommended PO groupings and the user has made selections via the "Customs" UI portion of FIG. 8), according to some embodiments. The "Vessel" name field 903 allows the user to enter in the particular vessel ID to be searched so that the cumulative savings can be indicated over a period of time. The "date range" UI element 905 allows the user to select the time range for the cumulative savings for a particular vessel. The "methods" UI element 907 and the "Company X rules" UI elements 909 are configured to receive user selections or implement particular buyer/seller rules so that the corresponding data can be viewed in the chart 911 and under the optimization history 913. For example, in response to receiving a selection of the "Enforced" identifier under the "Methods" UI element 907 (and not any other identifiers), the screenshot 900 may provide cumulative savings for only the "enforced" rules (and not the "relaxed" or "fixed" rues). FIG. 9 illustrates that all three "Enforced," "Relaxed," and "Fixed" identifier fields have been selected such that all the costs and savings associated therewith and corresponding graphs are displayed to the screenshot 900.

Under the UI element 909, there are various listed Customer X rules (e.g., corresponding to the buyer/seller data store 125 and/or the explicit buyer/seller rules 508). The first rule reads "60 PO max per entry" which indicates that no more than 60 purchase orders may be consolidated to a single entry. The second rule reads "No PGA items consolidate" which indicates that no purchase orders and/or goods that are subject to regulation by PGA are not to be consolidated (or only PGA items can be consolidated together). The Third rule reads "exclude specified event codes (e.g., class 60 car accessories and car parts described by National Engine Freight Classification (NMC)) from consolidation" which may be indicative of excluding certain classes or types of goods from consolidation. The fourth rule reads "Exclude POs below $2,500), which specifies to not consolidate (or refrain from consolidating) any purchase orders below this amount. The fifth rule reads "Exclude anti-dumping and Countervailing," which is indicative of excluding goods for consolidation that are or maybe subject to anti-dumping and/or countervailing duties or fees. Anti-dumping (AD) and Countervailing (CV) corresponds to additional fees that the U.S. Department of Commerce uses to discourage demand for goods deemed to be import sensitive. AD duties are assessed when it is determined that foreign suppliers or manufacturers are selling goods in the U.S. at less-than-fair market value. CV duties are applicable when a foreign government provides subsidies or assistance to a local industry (e.g., low-rate loans, tax exemptions, etc.). This assistance enables these suppliers and manufacturers to potentially export and sell goods for less than domestic (U.S.) companies. The sixth rule reads "Exclude Informal Lines," which is indicative of excluding particular freight lines or shipping companies (e.g., the identity of which may be determined from the sensor data from the sensors described in FIG. 4). The sixth rule reads "Exclude 'feather' product descriptions," which is indicative of excluding any good from consolidation where the description includes the term "feather." As indicated in the UI element 909, one or more fields corresponding to any of these rules may be selected, each of which, when selected, change the output graph and summary 911.

In some embodiments, the "enforced" identifier indicates particular buyer/seller rules that are enforced or followed. In some embodiments, the "Relaxed" identifier indicates particular buyer/seller rules that are soft rules or not always enforced. In some embodiments, the "Fixed" identifier indicates that all rules other than buyer/seller (e.g., customs agency rules) are enforced or followed. In some embodiments, the "Fixed" identifier alternatively or additionally indicates that a rule is not ever modifiable (e.g., a rule that cannot be relaxed). For each identifier, particular costs, savings, are caused to be displayed. For example, the screenshot 900 indicates that when the rules were "Relaxed," there was the most savings, compared to when the rules were strictly "Enforced" or "Fixed."

The cumulative savings UI element 911 includes a graph and statics that illustrate the savings in money made for consolidating POs under enforced, relaxed, and/or fixed methods according to the selection made under the element 907. The "method" attribute indicates the type of method selected under the UI element 907. The "theoretical max" attribute indicates the total amount of money it will cost to import goods associated with one or more consolidated purchase orders for a given date range (e.g., April 1 through June 30$^{th}$ as illustrated in the graph) for a given method or rule constraints. The "company X cost" indicates the amount of money it will cost a particular buyer/seller of corresponding purchase orders for the given date range and method or rule constraints. The "potential savings" attribute indicates the potential savings in dollar amount by consolidating particular POs to particular entries for a given date range and rule constraints. The "percentage savings" attribute indicates the potential savings in percentage by consolidating particular POs to particular entries for a given date range and rule constraints. The optimization history 913 generally indicates a summary of the shipments or vessels of shipments coming in, along with the expected costs and savings for the respective shipment or vessels.

FIG. 10 is a screenshot 1000 of an example user interface that illustrates costs associated with consolidating and not consolidating purchase orders, according to some embodiments. In some embodiments, the system (e.g., the presentation component 520) causes display of the screenshot 1000 in response to receiving a selection of the "incoming" button 915 of FIG. 9. In some embodiments, the screenshot 1000 represents the optimization history 913 of FIG. 9. The screenshot 1000 summarizes the shipments or vessels of shipments coming in, along with the expected costs and savings for the respective shipment or vessels. In some embodiments, optimization (e.g., the consolidation component 504 functionality) has already occurred and FIG. 10 is responsively generated. In some embodiments, a selection of any of the widgets, records, or attributes in FIG. 10 causes a specific vessel or shipment view to be displayed.

The "Vessel" attribute within the screenshot 1000 indicates the vessel ID for which one or more POs were consolidated. As described above, he "SCAC" attribute indicates a "Standard Carrier Alpha Code," which is an identifier used to identify road transport companies used for the given vessel on the given date. The "date" attribute indicates the date at which a particular optimization (e.g., a consolidation performed by the consolidation component 504) for a particular vessel on a particular date occurred on. Alternatively or additionally the date can correspond to the date at which corresponding goods were loaded for importing. The "co. X MPF" attribute indicates what the MPF fee due for importing the associated freight to/from company X would be if there were no optimizations (e.g., consolidations performed by the consolidation component 504). The "co. X expected cost attribute" indicates what the total cost for importing freight would be to/from company X if there were not optimizations for the particular date and Vessel. The "co. X realized MPF savings" attribute indicates the MPF savings, in dollars, would be if there were not optimizations performed. The "optimized MPF" attribute indicates what the MPF cost would be for company X on the given date for the given vessel assuming one or more optimizations occur (e.g., consolidations generated by the consolidation component 504). The "optimized expected cost" indicates what the total cost would be for company X on the given date for the given vessel assuming one or more optimizations occur. The "optimized cost savings" attribute indicates what the savings, in dollars, would be if a set of records are consolidated to one or more entries for the particular date on the given vessel for company X. The "method" attribute corresponds to the rule-type constraints, as described with respect to the UI element 907. The "percent cost savings" attribute indicates what the savings, in percentage, would be if the set of records are consolidated to one or more entries for the particular date on the given vessel for company X. In this way, user experiences can be improved because the user can be shown a summary page or window (i.e., the screenshot 1000) that summarizes each purchase order or entry generated and their corresponding cost information both with and without optimization.

FIG. 11 is a screenshot 1100 of an example use interface that maps costs and savings associated to various entries, according to particular embodiments. In some embodiments, the screenshot 1100 is caused to be displayed in response to a receiving a user selection of a particular record associated with a vessel of FIG. 10. FIG. 11 lists each entry or consolidated entry for a given vessel, indicated by the "ENTRY ID" attribute. The "PO COUNT" attribute corresponds to the quantity of purchase orders consolidated to a particular entry. The "Inspection probability" attribute in various embodiments corresponds with the probability that the entry or set of POs will get inspected (e.g., as determined by the risk of inspection component 502). The "PO TOTAL" attribute in some embodiments corresponds to the total value of the goods within all of the consolidated POs for a particular entry. For example, each PO can have an agreed upon purchase amount. If each agreed upon purchase amount can be added up, this can represent the PO total. The "TOTAL MPF AMOUNT" attribute in some embodiments refers to the MPF price amount for a given entry. The "MPF SAVINGS" in some embodiments corresponds to the amount of MPF saved based on the system optimizing (e.g., the system 500 performing its functionality). In various embodiments, in response to receiving a selection of an "Actions" identifier (e.g., identifier 1103) within a record, the system causes a view to be displayed of each purchase order within an entry corresponding with the record selected.

The header 1105 of the screenshot 1100 indicates a vessel identifier and/or a SCAC identifier (e.g., as indicated in the "vessel" and "SCAC" attributes in FIG. 10), as well as the type of rule constraint ("fixed"), and the date that the vessel will arrive (or has left) for inspection. The body 1107 indicates the "total entries," which is the total quantity of entries for corresponding purchase orders and goods that the vessel will carry for the particular date. The body 1107 also indicates the "optimized cost savings," which is the total amount, in dollars, that is saved by optimizations performed (e.g., by the consolidation component 504) for some or all of the entries for the given vessel on the given date. The "MPF and inspections cost" indicates the total amount it will cost a customer (which includes the MPF cost or fee plus inspection costs) for all goods of entries the customer has purchased that are on the particular vessel for the particular date, which takes into account optimizations or consolidation savings.

FIG. 12 is a screenshot 1200 of a user interface that illustrates specific purchase order information for a given entry, according to some embodiments. In some embodiments, the screenshot 1200 is caused to be displayed in response to receiving a selection of the "Actions" identifier 1103 for ENTRY ID 34 of FIG. 11. FIG. 12 illustrates detailed information for each purchase order that has been consolidated (e.g., via the consolidation component 504) to entry 34. In some embodiments, the "NUM ITEMS" attribute corresponds to the quantity of types of goods or items for a given entry of PO. For example, the entry may include fruits, toy cars, and gloves corresponding to a NUM ITEMS count of 3. The "PURCHASE ORDER NUMBER" corresponds to the purchase order ID. The "BILL OF LADING" corresponds to an identifier for a particular bill of lading of a given entry or PO. A bill of lading is a document issued by a carrier to acknowledge receipt of cargo for shipment. The bill of lading can include shipper and carrier details, such as goods that are shipped, where shipment is going or coming from, and the like. The bill of lading can be proof that the carrier has received the freight in suitable condition, as provided by the shipper. The bill of lading can also indicated that the goods may be transferred to the holder of the bill of lading (e.g., the carrier) to be transferred to someone else, such as the consignee. The "PO value" indicates the cost of the purchase order, which may be a sub-cost of the "PO TOTAL" as described above with respect to FIG. 11. The "PGA ITEM FLAG" attribute in some embodiments refers to a quantity of rules or constraints that are to be enforced for the entry ID 34 or purchase order (e.g., the rules indicated within the explicit customs rules 505 and/or the explicit buyer/seller rules 508). In some embodiments, the "EVENT" attribute corresponds to different sets of the same purchase order. In some embodiments, in response to receiving a user selection of the "Show Invoice" attribute, a specific invoice is displayed for the given PO.

FIG. 13 is a screenshot 1300 of an example user interface illustrating invoice details 1303 of a particular purchase order, according to some embodiments. In some embodiments, the screenshot 1300 is provided in response to receiving a selection of the "View" button 1203 for one of the records or POs within the screenshot 1200 of FIG. 12. In some embodiments, the "total value" attribute is indicative of the total cost to import or buy (or the total value of) particular items (e.g., goods) or item types, where each record corresponds to an item/item type. For example, for purchase order number 5217962181, there are items that each have a particular "total value." In some embodiments, the "tariff number" attribute corresponds to the tariff code or product-specific code as documented in the Harmonized System (HS) maintained by the World Customs Organization (WCO). Tariff codes may exist for virtually every product/good involved in global commerce. These codes are typically required on official shipping documents for tax assessment purposes. In some embodiments, the "description" attribute corresponds to a natural language description of the corresponding item or product/good. The invoice details 1303 further illustrates individual invoice line items, including inspection probability. In some embodiments, the "inspect prob line" attribute corresponds to inspection probabilities of any given item or product/good used to calculate inspection probabilities (e.g., by the risk of inspection component 502) for associated purchase orders/entries.

FIG. 14 is a flow diagram of an example process 1400 for consolidating items, according to some embodiments. The process 1400 (and/or any of the functionality described herein) may be performed by processing logic that comprises hardware (e.g., circuitry, dedicated logic, programmable logic, microcode, etc.), software (e.g., instructions run on a processor to perform hardware simulation), firmware, or a combination thereof. Although particular blocks described in this disclosure are referenced in a particular order at a particular quantity, it is understood that any block may occur substantially parallel with or before or after any other block. Further, more (or fewer) blocks may exist than illustrated. For example, in some embodiments, block 1404 and/or 1402 is not performed. In another example, there are other added blocks, such as sending a control signal to activate a device in response to block 1408. Such added blocks may include blocks that embody any functionality described herein. The computer-implemented method, the system (that includes at least one computing device having at least one processor and at least one computer readable storage medium), and/or the computer program product/ apparatus as described herein may perform or be caused to perform the process 1400, and/or any other functionality described herein.

Per block 1402, one or more rule data sets are received (e.g., explicit rules 506 and/or 508). For example, the rules can be buyer, seller, and or customs rules for consolidating records or POs (purchase orders). In some embodiments, the rule data sets include one or more rules from a customs agency, as described for example with respect to the customs data store 123 and/or the explicit customs rule(s) 506 of FIG. 5. In an illustrative example, a rule can be received that specifies certain types of goods (e.g., fruit) are inspected and/or items from certain countries are always inspected. In some embodiments, the rule data sets include one or more rules from a buyer (and/or seller) associated with the plurality of records, as described for example, with respect to the buyer/seller data store 125 and/or the explicit buyer/seller rule(s) 508. In some embodiments, the rule data sets are associated with constraints controlling how records are to be consolidated, where the records include attributes of goods (e.g., POs) that are to be received for importing. For example, the one or more rules may include one or more rules similar or identical to the rules specified under the UI element 909 (e.g., "60 POs max per entry.").

Per block 1404, one or more extracted features are processed or run through a machine learning model. In some embodiments, this includes extracting features from historical data and processing the extracted features through a machine learning model. Examples of this are described with respect to the risk of inspection component 502, the learning module 510, and the feature space visualization 1500 of FIG. 15 where embodiments derive a feature vector in order to generate a prediction. In some embodiments, this "historical data" includes past purchase orders that have been labeled as "inspected" or "not inspected," as described with respect to FIG. 15, for example.

In block 1404, learned information may be obtained (e.g., from the learning module 510). For example, a machine learning model can learn particular patterns or associations of customs agencies that are not necessarily hard rules, such as identifying that customs agencies tend to inspect a particular good above a threshold only a particular time of year, such as a season or other time window (e.g., days, weeks, months, etc.). These predictions or calculations can occur via any suitable probabilistic model, such as a Bayesian network, a TAN model, Naïve Bayes classifier, a factor graph, a clique tree, Markov random field, a chain graph, or any other suitable technique. For example, in some embodiments, predictions include using a Bayesian network graph. A Bayesian network graph is a directed acyclic graph that maps the relationships between nodes (e.g., events) in terms of probability. These graphs show how the occurrence of particular events influence the probability of other events occurring. Each node is also conditionally independent of its non-descendants. These graphs follow the underlying principle of Bayes' theorem, represented as:

$$P(A \mid B) = \frac{P(B \mid A)P(A)}{P(B)}, \quad \text{Equation 1}$$

where A and B are events and $P(B) \neq 0$. That is, the probability (P) of A given B=the probability of B given A multiplied by the probability of (A) all over the probability of B.

Per block 1406, the risk of inspection of goods are determined (e.g., as describe with respect to the risk of inspection component 502). In some embodiments, block 1406 includes generating an estimate score (e.g., an integer) that is indicative of the risk for inspection for a first set of goods that are to be imported. For example, referring back to the example of block 1402, a rule can be received that specifies certain types of goods (e.g., fruit) are inspected. And that certain type of good is to be imported. Accordingly, embodiments determine that there is a 100% chance of inspected (or near 100% chance) and responsively score the good (or associated PO since it contains the good) a 10 on a scale of 1 to 10, which 10 being the highest likelihood of inspection.

In some embodiments, the estimate score is generated based at least in part on the receiving of the rule data sets and/or the processing of the features through the machine learning model (blocks 1402 and 1404). For example, using the illustration above in block 1404, a machine learning model can be used to derive and embed a feature vector indicating that customs agencies tend to inspect a particular good above a threshold only a particular time of year. However, it may not quite be the particular time of year but the particular good may be the same as the good analyzed at block 1406. Accordingly, the classification may be "intermediate risk of inspection" (e.g., as described with respect to FIG. 15). Using the illustration above per block 1402, it may be also determined that a customs rule may specify that certain goods from certain countries are always inspected. Even though the goods at block 1406 may match these certain goods, the country of origin may not match such that they are not always inspection. Accordingly, the risk of inspection component can downgrade, weight, or otherwise change the original "intermediate risk of inspection" prediction even lower, since the goods and country to not violate the customs rule.

In another example, it can be determined that because one of the rule data sets (per block 1402) indicate that buyer X always wants good Y to be consolidated, good Y is on a current shipment to be imported, and good Y has a high probability of inspection. Additionally or alternatively, it can be determined (e.g., via block 1404) that good Y is always inspected on during December, and it may happen to be December and the same good Y may be up for inspection. Accordingly, the risk of inspection is deemed to be high. In some embodiments, even though blocks 1402 and 1404 are performed, the actual risk of inspection per block 1406 may be based only on a single block, but not both.

Per block 1408, one or more records (e.g., purchase orders) are consolidated (or recommended to be consolidated) to a single instance (e.g., an entry or purchase order) (e.g., as described with respect to the consolidation component 504). In some embodiments, based at least in part on the generated estimate score, embodiments can consolidate (or refrain from consolidating) the plurality of records to the single instance for the first set of goods. For example, each of the goods described with respect to block 1406 may be identified in one or more purchase orders. Particular embodiments recommend refraining from consolidating purchase orders if any good identified in any of the purchase orders has a risk of inspection score over a threshold indicating that the risk of inspection of the good is high. Some embodiments recommend consolidating purchase orders if all of the goods identified in each of the purchase orders have a risk of inspection score below a threshold indicating that the risk of inspection of all of the goods in all purchase orders is low.

Consolidation (or recommendation of consolidation) of records occurs based on the rule data sets, the obtained learned information, and/or the risk of inspection corresponding to the blocks 1402, 1404, and 1406 respectively. In some embodiments, the consolidation of records additionally or alternatively occurs based at least in part on receiving user selections or information from the user feedback module 512. In some embodiments, the consolidation of records is additionally or alternatively occurs based on the third party data store 516 or the sensor data obtained from the freight vessel 120. Each of these phases or signals in various embodiments is weighted or scored based on importance or ranking. For example, customs rules may be weighted higher than buyer/seller rules or any sensor data obtain from a freight vessel. In some embodiments, the consolidation of records per block 1408 is proceeded by scoring different candidate single instance groups and selecting the instance(s) with a score above a threshold.

In some embodiments, the plurality of records is indicative of a plurality of purchase orders and the single instance is indicative of a single entry, as described, for example, with respect to FIG. 6 through FIG. 13. In some embodiments, the consolidating at block 1408 (and/or the determining of the risk of inspection per block 1406) is further based at least in part on sensor data obtained from the freight vessel (e.g., as described with respect to FIG. 4). For example, one of the rules or learned data indicates that the risk of inspection is high on a particular Monday. Embodiments can receive telematics device information or other sensor data described with respect to FIG. 4 to determine the speed of the vessel to determine the predicted arrive at a port of entry for inspection. Based on this information, it can be determined that the vessel will arrive on the particular Monday given the sensor data, thereby predicting that the inspection risk is high and thereby selectively refraining from consolidating entries.

In some embodiments, the consolidation at block 1408 occurs iteratively such that there are groups of candidate consolidation instances that the system chooses from as the most optimal group, such as by using a genetic algorithms, as described above. For example, blocks 1404 through 1408 can be repeated for different combinations of rule data sets, learned information, risk of inspection, etc. In some embodiments, there is a tangible output as a result of the consolidation of records, such that the goods of the consolidated POs are then removed from a freight vessel and organized for shipment (e.g., loaded into a carrier vehicle) to their appropriate destinations. For example, as a result of consolidating records of goods that are not subject to inspection, the goods may be more quickly loaded for the next phase, such as loading the non-inspected goods into a delivery truck, as opposed to waiting for inspection to then load the goods. Some embodiments do not consolidate records, per se, per block 1408 but rather flag the records as requested or recommended candidates for consolidation such that the user may choose to actually consolidate records via user interface selection or input.

Some embodiments perform additional functionality in response to block 1408, such as computing or determining any of the screenshot or user interface information as described herein with respect to FIG. 6 through FIG. 13. For example, some embodiments compute a cost savings based on consolidating of the plurality of records to the single instance. This is described for example, with respect to FIG. 7 through FIG. 12. Some embodiments cause generation of the user interface 1410 based on these computations or determinations, as described with respect to FIG. 6 through FIG. 13.

Per block 1410, some embodiments cause generation of a user interface.

Some embodiments provide additional functionality subsequent to block 1404, such as send a control signal as described with respect to FIG. 5 or generate a user interface (e.g., as described with respect to FIGS. 6 through 13).

FIG. 15 is a schematic diagram of an example visualization of feature space 1500 that illustrates various feature vectors representing individual goods (or purchase orders that include a group of goods) and corresponding risk-of-inspection groups, according to some embodiments. In some embodiments, FIG. 15 represents functionality performed by the risk of inspection component 502 and/or the learning module 510. A "feature vector" (also referred to as a "vector") as described herein includes one or more real numbers, such as a series of floating values or integers (e.g., [0, 1, 0, 0]) that represent one or more other real numbers, a natural language (e.g., English) word and/or other character sequence or data sets (e.g., a symbol (e.g., @, !, #), a phrase, sentence, contents in a PO, a description of goods, etc.). Such natural language words and/or character sequences correspond to the set of features and are encoded or converted into corresponding feature vectors so that computers can process the corresponding extracted features.

A plurality of feature vectors that are embedded based on distance (e.g., Euclidian distance) represent "feature space." The distance between any two feature vectors or class/cluster of vectors is measured according to any suitable method. For example, in some embodiments, automated cosine (or Euclidian) distance similarity is used to compute distance. Cosine similarity is a measure of similarity between two non-zero feature vectors of an inner product space that measures the cosine of the angle between the two non-zero feature vectors. In these embodiments, no similarity is expressed as a 90 degree angle, while total similarity (i.e., the same word) of 1 is a 0 degree angle. For example, a 0.98 distance between two contextual vectors reflects a very high similarity while a 0.003 distance reflects little similarity.

Some embodiments generate or derive a feature vector that computers are configured to analyze. For example, the word "bananas" on a PO can be converted into a first feature vector via vector encoding (e.g., one hot encoding). For instance, the word "Banana" may be converted into the vector [1,0,0,0,0,0,0,0,0,0]. This vector representation may correspond to ordered words (e.g., each word in a sentence or vocabulary) and whether the word is TRUE or present. Because "Banana" is the only word being converted in this example, the integer 1 is used to indicate its representation. In this example, the PO does not contain any of the other words with it so the other values are represented as 0. In various embodiments, each character sequence (e.g., a word) in a PO is one-hot encoded by aggregating multiple words of a PO (e.g., bananas, bikes, watch, or other specified goods) into single token. This may be considered as one token and is represented as a one hot vector with one 1 element and all remaining elements 0s.

In some embodiments, the learning module 510 and/or the risk of inspection component 502 aggregates each feature value of a vector based on performing a linear function or otherwise combining the output (e.g., a dot product or a softmax function) where the output is a feature vector or vector space embedding. The feature vector may thus be indicative of the actual coordinates that a feature vector will be embedded in feature space. For example, using the illustration above, the encoded "banana" feature vector [1,0,0,0,0,0,0,0,0,0] can be converted or encoded to an output layer vector [1,2], which is the 2-dimensional plotting coordinates in feature space.

In some embodiments, the feature space 1500 represents the functionality used by the risk of inspection component 502 an/or the learning module 510 to determine the class or cluster of inspection risk that a given data point belongs to In some embodiments, the feature space 1500 includes classes of data points (e.g., data point 1503-1 and data point 1503-2) representing individual feature vectors corresponding to specific goods, purchase orders that indicate particular goods, and/or particular entries. These data points are formed together to form a particular class or cluster. For example, the data point 1503-1 and data point 1503-2 have been classified as "high inspection risk" 1103 (indicative that the feature values of the data points 1503 are within a threshold distance to or similar to other trained data points). There are other classes, such as class 1505 (e.g., "low inspection risk") and the class 1107 (e.g., "intermediate inspection risk").

In an illustrative example of how the feature space 1500 is used, embodiments may receive a set of historical purchase orders and/or goods that are labeled as "inspected" or "not inspected" indicative of whether the historical purchase orders and/or goods were subject to inspection or no inspection respectively. Responsively, some embodiments run a first labeled PO through one or more machine learning models in order to extract and weight features (e.g., date of inspection, date that import was completed/began, particular goods, time of inspection, port of inspection, etc.) for the first PO, after which a feature vector (e.g., representing the data point 1503-1) is embedded in the feature space 1500 based on the features. The feature space 1500 in various embodiments represents a multidimensional coordinate system where each feature is associated with one or more dimensions. For example, a first PO may be embedded where a first axis represents a date of inspection and the second axis represents the particular goods in the PO. Each feature value within the feature vector may be summed or otherwise aggregated (e.g., via a dot product calculation) to arrive at a final coordinate point (e.g., the data point 1503-2) within the feature space 1500. Each of the data points within the class 1503, for example, are within a feature similarity threshold and so they are close to each other (e.g., based on Euclidian distance) in the feature space 1500. Responsive to the embedding of the feature vector in the feature space 1500, embodiments classify or cluster the first set of entries. For example, if a first vector represents data point 1503-1, then the classification that is nearest to the data point 1503-1 is determined to be the "high risk of inspection." Classification 1503 indicative of the PO, good, and/or entry having a high risk of being inspected. In this way, individual patterns for features can be identified for those goods, POs, and/or entries that have been labeled as "inspected" and "not inspected" so that embodiments can reliably predict the risk of inspection for a good, PO, and/or entry. For example, a machine learning model may identify a pattern that 98% of the goods, POs, and/or entries that were inspected were fruits and vegetables. Accordingly, if a current PO was being analyzed that includes fruit or vegetables, then embodiments can predict that a particular entry, PO, and/or good is in the "high risk of inspection" category or is otherwise at high risk of being inspected.

The machine learning model(s) are able to cluster or classify samples of new unseen good, PO, and/or entry (e.g., any PO, good, and/or entry received after training). In some embodiments, every good, PO, and/or entry is represented by the median of its samples' embeddings as shown below:

$$C_j = \text{Median}\{f_{Embed}(S_i^j): I=1,2,\ldots,n\}$$

Where $f_{embed}$ is the output of the model, $S_i^j$ is the $i^{th}$ sample of the $j^{th}$ class. The prediction for any test sample X is given by:

$$Pred(X) = \underset{j}{\arg\min} \| C_j - f_{embed}(X) \|.$$

However, it is understood that median is just one way to represent an embedding. Some embodiments alternatively use other statistics like mean, pth percentile, and the like.

Definitions

"And/or" is the inclusive disjunction, also known as the logical disjunction and commonly known as the "inclusive or." For example, the phrase "A, B, and/or C," means that at least one of A or B or C is true; and "A, B, and/or C" is only false if each of A and B and C is false.

A "set of" items means there exists one or more items; there must exist at least one item, but there can also be two, three, or more items. A "subset of" items means there exists one or more items within a grouping of items that contain a common characteristic.

A "plurality of" items means there exists more than one item; there must exist at least two items, but there can also be three, four, or more items.

"Includes" and any variants (e.g., including, include, etc.) means, unless explicitly noted otherwise, "includes, but is not necessarily limited to."

A "user" or a "subscriber" includes, but is not necessarily limited to: (i) a single individual human; (ii) an artificial intelligence entity with sufficient intelligence to act in the place of a single individual human or more than one human; (iii) a business entity for which actions are being taken by a single individual human or more than one human; and/or (iv) a combination of any one or more related "users" or "subscribers" acting as a single "user" or "subscriber."

The terms "receive," "provide," "send," "input," "output," and "report" should not be taken to indicate or imply, unless otherwise explicitly specified: (i) any particular degree of directness with respect to the relationship between an object and a subject; and/or (ii) a presence or absence of a set of intermediate components, intermediate actions, and/or things interposed between an object and a subject.

A "data store" as described herein is any type of repository for storing and/or managing data, whether the data is structured, unstructured, or semi-structured. For example, a data store can be or include one or more: databases, files (e.g., of unstructured data), corpuses, digital documents, etc.

A "module" is any set of hardware, firmware, and/or software that operatively works to do a function, without regard to whether the module is: (i) in a single local proximity; (ii) distributed over a wide area; (iii) in a single proximity within a larger piece of software code; (iv) located within a single piece of software code; (v) located in a single storage device, memory, or medium; (vi) mechanically connected; (vii) electrically connected; and/or (viii) connected in data communication. A "sub-module" is a "module" within a "module."

The terms first (e.g., first request), second (e.g., second request), etc. are not to be construed as denoting or implying order or time sequences unless expressly indicated otherwise. Rather, they are to be construed as distinguishing two or more elements. In some embodiments, the two or more elements, although distinguishable, have the same makeup. For example, a first memory and a second memory may indeed be two separate memories but they both may be RAM devices that have the same storage capacity (e.g., 4 GB).

The term "causing" or "cause" means that one or more systems (e.g., computing devices) and/or components (e.g., processors) may in in isolation or in combination with other systems and/or components bring about or help bring about a particular result or effect. For example, the logistics server(s) 105 may "cause" a message to be displayed to a computing entity 110 (e.g., via transmitting a message to the user device) and/or the same computing entity 110 may "cause" the same message to be displayed (e.g., via a processor that executes instructions and data in a display memory of the user device). Accordingly, one or both systems may in isolation or together "cause" the effect of displaying a message.

The term "real time" includes any time frame of sufficiently short duration as to provide reasonable response time for information processing as described. Additionally, the term "real time" includes what is commonly termed "near real time," generally any time frame of sufficiently short duration as to provide reasonable response time for on-demand information processing as described (e.g., within a portion of a second or within a few seconds). These terms, while difficult to precisely define, are well understood by those skilled in the art.

The term "machine learning model" refers to a model that is used for machine learning tasks or operations. A machine learning model can comprise a title and encompass one or more input images or data, target variables, layers, classifiers, etc. In various embodiments, a machine learning model can receive an input (e.g., risk of inspection), and based on the input identify patterns or associations in order to predict a given output (e.g., that a certain set of entries should be consolidate). Machine learning models can be or include any suitable model, such as one or more: neural networks, word2Vec models, Bayesian networks, Random Forests, Boosted Trees, etc. "Machine learning" as described herein, in particular embodiments, corresponds to algorithms that parse or extract features of historical data (e.g., a data store of historical images), learn (e.g., via training) about the historical data by making observations or identifying patterns in data, and then receive a subsequent input (e.g., a current image) in order to make a determination, prediction, and/or classification of the subsequent input based on the learning without relying on rules-based programming (e.g., conditional statement rules).

V. CONCLUSION

Many modifications and other embodiments of the inventions set forth herein will come to mind to one skilled in the art to which these inventions pertain having the benefit of the teachings presented in the foregoing description and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

What is claimed is:

1. A method comprising:
   training a machine learning model by:
      extracting a set of historical features from historical data comprising past purchase orders that have been labeled as inspected or not inspected;
      converting the set of historical features into one or more representative feature vectors; and
      processing the one or more representative feature vectors using the machine learning model to identify a vector space representative of the set of historical features; subsequent to training the machine learning model:
   extracting, by at least one computer processor, a set of features from a plurality of purchase orders, wherein each purchase order of the plurality of purchase orders comprises a feature of a good that is to be received for importing;
   converting, by the at least one computer processor, the set of features into one or more feature vectors;
   processing, by the at least one computer processor, the one or more feature vectors using the machine learning model to generate a prediction for a set of goods associated with the plurality of purchase orders of being inspected by a customs clearance agent, wherein the machine learning model generates the prediction based at least in part on determining a distance, in the vector space, between the one or more feature vectors and the one or more representative feature vectors;
   accessing rule data sets associated with constraints controlling how the plurality of purchase orders is to be consolidated to an entry, wherein the entry corresponds to a customs clearance document identifying at least one of the set of goods that is to be received for importing;
   based at least in part on the prediction and the rule data sets, automatically generating, by the at least one computer processor, an estimated risk for inspection by the customs clearance agent for the set of goods;
   based at least in part on the estimated risk, automatically consolidating, by the at least one computer processor, the plurality of purchase orders to a single entry for importing the set of goods;
   in response to automatically consolidating the plurality of purchase orders, storing, by the at least one computer processor, the single entry to a storage device such that the plurality of purchase orders is configured to be accessed from the storage device via a single computer input/output operation; and
   based at least in part on consolidating the plurality of purchase orders, causing a user interface to be generated that renders information associated with consolidating the plurality of purchase orders.

2. The method of claim 1, wherein the rule data sets include one or more rules from a customs agency.

3. The method of claim 2, wherein the rule data sets include a predefined rule that the customs agency enforces and is to be abided by, and the one or more rules include at least one of a first rule that a first specific good is always inspected regardless of where the first specific good came from or a second rule that a second specific good is only inspected if the second specific good came from a specific geographic location associated with pestilence or disease.

4. The method of claim 1, wherein the rule data sets include one or more rules from a buyer associated with the plurality of purchase orders.

5. The method of claim 4, wherein the one or more rules includes a predefined rule that the buyer enforces and is to be abided by, and the one or more rules include at least one of a first rule that indicates that first certain goods are not to be contained in a same entry for importing or a second rule that second certain goods are always to be contained in the same entry for importing.

6. The method of claim 1, further comprising computing, by the at least one computer processor, a cost savings based on consolidating the plurality of purchase orders to the single entry, wherein the cost savings is included in the user interface.

7. The method of claim 1, wherein consolidating the plurality of purchase orders is further based at least in part on sensor data obtain from a freight vessel.

8. One or more non-transitory computer storage media having computer-executable instructions embodied thereon that, when executed by one or more processors, cause the one or more processors to perform operations comprising:
subsequent to training a machine learning model:
extracting a set of features from a plurality of purchase orders, wherein each purchase order of the plurality of purchase orders comprises a feature of a good that is to be received for importing;
converting the set of features into one or more feature vectors;
processing the one or more feature vectors using the machine learning model to generate a prediction for a set of goods associated with the plurality of purchase orders of being inspected by a customs clearance agent, wherein the machine learning model generates the prediction based at least in part on determining a distance, in a vector space, between the one or more feature vectors and one or more representative feature vectors, and training the machine learning model comprises:
extracting a set of historical features from historical data comprising past purchase orders that have been labeled as inspected or not inspected;
converting the set of historical features into the one or more representative feature vectors; and
processing the one or more representative feature vectors using the machine learning model to identify the vector space representative of the set of historical features;
accessing at least one rule data set associated with constraints controlling how the plurality of purchase orders is to be consolidated to an entry, wherein the entry corresponds to a customs clearance document identifying at least one of the goods that is to be received for importing;
based at least in part on the prediction and the at least one rule data set, automatically generating, for each good of the set of goods, an estimated risk for inspection by the customs clearance agent;
based at least in part on the estimated risk for each good of the set of goods, automatically consolidating the plurality of purchase orders to a single entry for importing the set of goods;
in response to automatically consolidating the plurality of purchase orders, storing the single entry to a storage device; and
based at least in part on consolidating the plurality of purchase orders, causing a user interface to be generated that renders information associated with consolidating the plurality of purchase orders.

9. The one or more non-transitory computer storage media of claim 8, wherein the at least one rule data set includes one or more rules from a customs agency.

10. The one or more non-transitory computer storage media of claim 8, wherein the at least one rule data set includes one or more rules from a buyer or a seller associated with the plurality of purchase orders.

11. The one or more non-transitory computer storage media of claim 8, wherein the operations further comprise computing a cost savings based on consolidating the plurality of purchase orders to the single entry, and the cost savings is included in the user interface.

12. The one or more non-transitory computer storage media of claim 8, wherein consolidating the plurality of purchase orders is further based at least in part on sensor data obtain from a freight vessel.

13. A system comprising:
one or more processors; and
one or more computer storage media storing computer-useable instructions that, when executed by the one or more processors, cause the one or more processors to perform operations comprising:
training a machine learning model by:
extracting a set of historical features from historical data comprising past purchase orders that have been labeled as inspected or not inspected;
converting the set of historical features into one or more representative feature vectors; and
processing the one or more representative feature vectors using the machine learning model to identify a vector space representative of the set of historical features; subsequent to training the machine learning model:
extracting, by at least one computer processor, a set of features from a plurality of purchase orders, wherein each purchase order of the plurality of purchase orders comprises a feature of a good that is to be received for importing;
converting, by the at least one computer processor, the set of features into one or more feature vectors;
processing, by the at least one computer processor, the one or more feature vectors using the machine learning model to generate a prediction for each good of a set of goods associated with the plurality of purchase orders of being inspected by a customs clearance agent, wherein the machine learning model generates the prediction based at least in part on determining a distance, in the vector space, between the one or more feature vectors and the one or more representative feature vectors;
accessing at least one rule data set associated with constraints controlling how the plurality of purchase orders is to be consolidated to an entry, wherein the entry correspond to a customs clearance document identifying at least one of the goods that is to be received for importing;
based at least in part on the prediction and the at least one rule data set, generating, for each good of the set of goods, an estimated risk for inspection by the customs clearance agent;
based at least in part on the estimated risk for each good of the set of goods, automatically consolidating the plurality of purchase orders to a single entry for importing the set of goods;
storing the single entry to a storage device; and
based at least in part on consolidating the plurality of purchase orders, causing a user interface to be generated that renders information associated with consolidating the plurality of purchase orders.

14. The system of claim 13, wherein the at least one rule data set includes one or more rules from a buyer or a seller associated with the plurality of purchase orders.

15. The system of claim 14, wherein the one or more rules include a predefined rule that the seller or the buyer enforces and is to be abided by, and the one or more rules include at least one of a first rule that indicates that first certain goods are not to be contained in a same entry for importing or a second rule that second certain goods are always to be contained in the same entry for importing.

16. The system of claim 13, wherein the at least one rule data set includes one or more rules from a customs agency.

17. The system of claim 16, wherein the at least one rule data set includes a predefined rule that the customs agency enforces and is to be abided by, and the one or more rules includes at least one of a first rule that a first specific good is always inspected regardless of where the first specific good came from or a second rule that a second specific good is only inspected if the second specific good came from a specific geographic location associated with pestilence or disease.

18. The system of claim 13, wherein the operations further comprise computing a cost savings based on consolidating the plurality of purchase orders to the single entry, and the cost savings is included in the user interface.

* * * * *